(12) United States Patent
Zhao et al.

(10) Patent No.: US 12,204,194 B2
(45) Date of Patent: Jan. 21, 2025

(54) DISPLAY PANEL AND DISPLAY DEVICE

(71) Applicant: Shanghai Tianma Micro-Electronics Co., Ltd., Shanghai (CN)

(72) Inventors: Jian Zhao, Shanghai (CN); Zhidan Su, Shanghai (CN); Hong Zhang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/882,387

(22) Filed: Aug. 5, 2022

(65) Prior Publication Data

US 2023/0384631 A1    Nov. 30, 2023

(30) Foreign Application Priority Data

May 30, 2022  (CN) .......................... 202210597590.5

(51) Int. Cl.
| | | |
|---|---|---|
| *G02F 1/1333* | (2006.01) | |
| *G02F 1/1345* | (2006.01) | |
| *G02F 1/1362* | (2006.01) | |
| *G02F 1/1339* | (2006.01) | |
| *H05B 3/56* | (2006.01) | |

(52) U.S. Cl.
CPC .... *G02F 1/133382* (2013.01); *G02F 1/13452* (2013.01); *G02F 1/136286* (2013.01); *G02F 1/1339* (2013.01); *G02F 1/13458* (2013.01); *H05B 3/56* (2013.01)

(58) Field of Classification Search
None
See application file for complete search history.

(56) References Cited

U.S. PATENT DOCUMENTS

2020/0201109 A1*  6/2020  Zhao ................. G02F 1/133382
2021/0048705 A1   2/2021  Lin et al.

FOREIGN PATENT DOCUMENTS

| | | |
|---|---|---|
| CN | 109031813 A | 12/2018 |
| CN | 109387962 A | 2/2019 |
| CN | 111752026 A | 10/2020 |
| CN | 108983476 B | 9/2021 |

\* cited by examiner

*Primary Examiner* — Dung T Nguyen
(74) *Attorney, Agent, or Firm* — Anova Law Group, PLLC

(57) ABSTRACT

A display panel includes a display area, a non-display area at least partially surrounding the display area, a plurality of heating wires, a first voltage terminal, and a second voltage terminal. The plurality of heating wires are arranged in the display area. The plurality of heating wires extend along a first direction and are arranged along a second direction. The first direction intersects with the second direction. Each heating wire of the plurality of heating wires includes a first signal end and a second signal end. The first signal end and the second signal end of the same heating wire are arranged on a first side of the display area along the first direction. The first voltage terminal and the second voltage terminal are arranged in the non-display area.

21 Claims, 15 Drawing Sheets

DISPLAY PANEL AND DISPLAY DEVICE

CROSS-REFERENCE TO RELATED APPLICATION

This application claims priority to Chinese Patent Application No. 202210597590.5, filed on May 30, 2022, the entire content of which is incorporated herein by reference.

TECHNICAL FIELD

The present disclosure relates to the display technology field and, more particularly, to a display panel and a display device.

BACKGROUND

Liquid crystal is a special form of material, which has the birefringence peculiar to crystal and fluidity of a liquid. A liquid crystal display is a display device made by using liquid crystal molecules, in which an optical property of the crystal molecules changes in an external electric field. The liquid crystal display has various types and has been widely used in various displays and electronic instruments. However, due to limitation of a liquid crystal material, response time of the liquid crystal increases at a low-temperature. After the response time of the liquid crystal increases, the display quality deteriorates, and a dynamic image has a problem such as tailing and smearing, which affects a visual effect. When the temperature decreases further (below −30° C.), an alignment layer of the display will be damaged, a liquid crystal state will disappear and become crystal, the performance of the liquid crystal state will be lost, and the screen will not be displayed.

In order to solve the above problems, in the existing technology, a heater is configured to heat the liquid crystal screen. For example, a heating device is arranged between a backlight source and a liquid crystal display device. As such, a thickness of a liquid crystal display assembly is increased, and complexity of a structure is increased.

SUMMARY

Embodiments of the present disclosure provide a display panel, including a display area, a non-display area at least partially surrounding the display area, a plurality of heating wires, a first voltage terminal, and a second voltage terminal. The plurality of heating wires are arranged in the display area. The plurality of heating wires extend along a first direction and being arranged along a second direction. The first direction intersects with the second direction. Each heating wire of the plurality of heating wires includes a first signal end and a second signal end. The first signal end and the second signal end of the same heating wire are arranged on a first side of the display area along the first direction. The first voltage terminal and the second voltage terminal are arranged in the non-display area. The first voltage terminal is electrically connected to the first signal end through a first heating bus. The second voltage terminal is electrically connected to the second signal end through a second heating bus. The first heating bus includes at least a first line segment arranged on the first side. The second heating bus includes at least a second line segment arranged on the first side. The first line segment and the second line segment extend along the second direction.

Embodiments of the present disclosure provide a display device, including a display panel. The display panel includes a display area, a non-display area at least partially surrounding the display area, a plurality of heating wires, a first voltage terminal, and a second voltage terminal. The plurality of heating wires are arranged in the display area. The plurality of heating wires extend along a first direction and being arranged along a second direction. The first direction intersects with the second direction. Each heating wire of the plurality of heating wires includes a first signal end and a second signal end. The first signal end and the second signal end of the same heating wire are arranged on a first side of the display area along the first direction. The first voltage terminal and the second voltage terminal are arranged in the non-display area. The first voltage terminal is electrically connected to the first signal end through a first heating bus. The second voltage terminal is electrically connected to the second signal end through a second heating bus. The first heating bus includes at least a first line segment arranged on the first side. The second heating bus includes at least a second line segment arranged on the first side. The first line segment and the second line segment extend along the second direction.

Compared with the existing technology, the display panel and the display device of the present disclosure at least achieve the following beneficial effects.

In the display panel and the display device of the present disclosure, the heating wire is arranged in the display panel. In the low-temperature display phase, the heating wire may be configured to heat the display panel, which satisfies the normal use requirement of the display product in a low-temperature environment. The structure of the product may be significantly simplified compared to the solution of additionally introducing the heater in the existing technology. In the present disclosure, the first signal ends and the second signal ends of the heating wires may be arranged on the first side of the display area along the first direction. The first line segment of the first heating bus and the second line segment of the second heating wire may be also arranged on the first side. On the first side, the first signal ends of all the heating wires may be electrically connected to the first line segment, and the second signal ends of all the heating wires may be electrically connected to the second line segment. Compared to the manner that the first signal ends or the second signal ends are connected to different wires, the wiring structure of the display device may be significantly simplified, which is beneficial to simplifying the manufacturing process and reducing the cost. In addition, the loop impedances of the heating wires may be substantially the same. Thus, the effective power obtained by the heating wires may be substantially the same, which is beneficial to realize a uniform heating effect of the different heating wires to the display area. Moreover, the first signal ends and the second signal ends of the heating wires and the first line segment and the second line segment of the heating buses are arranged on the first side of the display area. Thus, the frame space of the display panel may be appropriately used, which is beneficial to realizing the narrow frame design.

DETAILED DESCRIPTION OF THE EMBODIMENTS

Embodiments of the present disclosure are described in detail in connection with the accompanying drawings. Unless otherwise specified, a relative arrangement of components and processes, a numerical expression, and a numerical value described in embodiments of the present disclosure are not intended to limit the scope of the present disclosure.

Description of embodiments of the present disclosure is merely exemplary and illustrative and is not intended to limit the present disclosure.

A technology, a method, and a device known to those of ordinary skill in the art are not discussed in detail, but such the technology, method, and device should be considered as a part of the specification when it is appropriate.

In all examples shown and discussed herein, any specific value should only be considered illustrative and should not be considered a limitation. Thus, another exemplary embodiment may have a different value.

It is apparent to those skilled in the art that various modifications and variations can be made in the present disclosure without departing from the spirit or scope of the present disclosure. Thus, the present disclosure is intended to cover the modifications and variations of the present disclosure that are within the scope of the corresponding claims (claimed technical solutions) and the scope of equivalents of the claims. Embodiments of the present disclosure may be combined with each other when there is no contradiction.

A similar numeral and letter may refer to a similar item in the accompanying drawings. Thus, once an item is defined in a drawing, the item may not need to be further discussed in the subsequent drawings.

Figure 1:
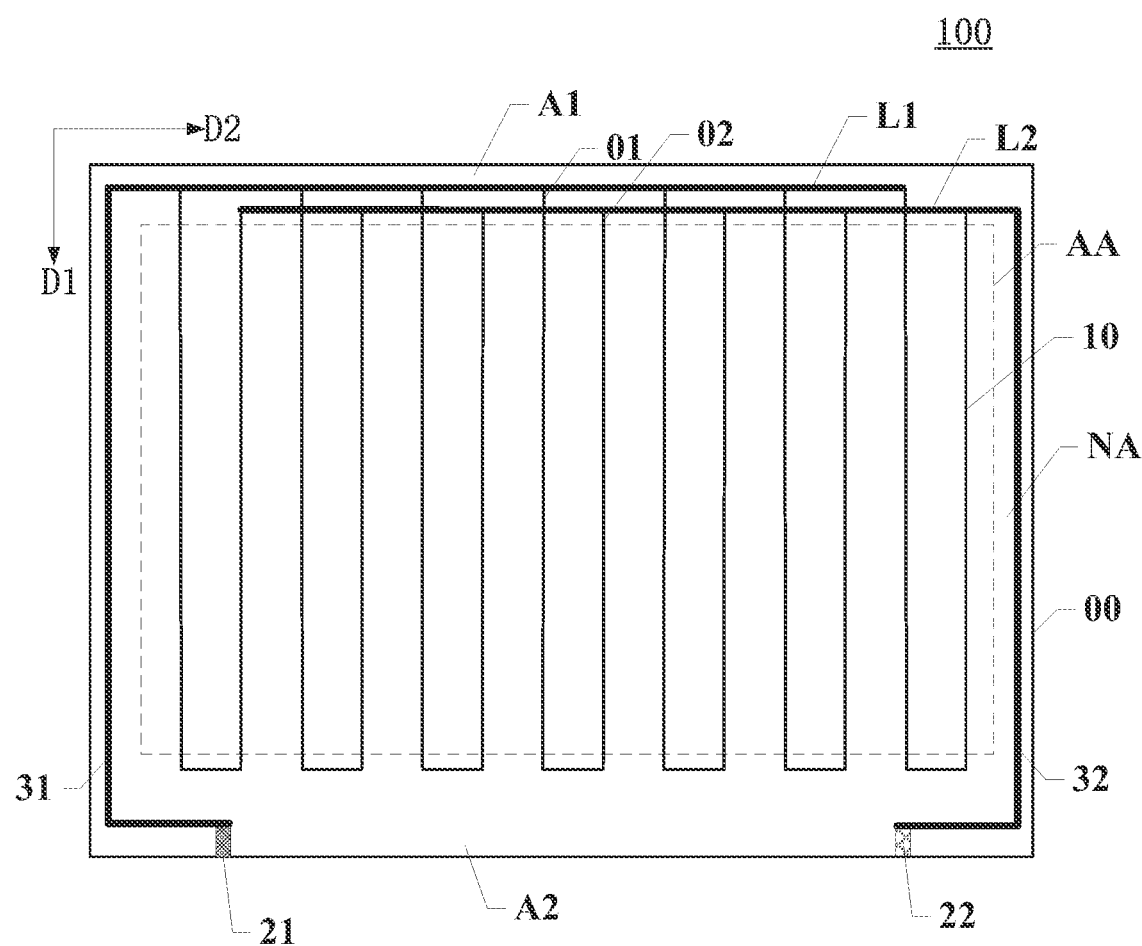
FIG. 1 is a schematic top view of a display panel according to some embodiments of the present disclosure.

FIG. 1 is a top view of a display panel provided by embodiments of the present disclosure. Refer to FIG. 1, embodiments of the present disclosure provide a display panel 100. The display panel includes a display area AA, a non-display area NA at least partially surrounding the display area AA, a plurality of heating wires 10, a first voltage terminal 21, and a second voltage terminal 22.

The plurality of heating wires 10 are at least located in the display area AA. The plurality of heating wires 10 extend along a first direction D1 as a whole and are arranged along the second direction D2. The first direction D1 and the second direction D2 intersect with each other. Each heating wire 10 of the plurality of heating wires 10 includes a first signal end 01 and a second signal end 02. The first signal end 01 and the second signal end 02 of each heating wire 10 are located on a first side A1 of the display area AA along the first direction D1.

The first voltage terminal 21 and the second voltage terminal 22 are located in the non-display NA. The first voltage terminal 21 is electrically connected to the first signal end 01 through a first heating bus 31. The second voltage terminal 22 is electrically connected to the second signal end 02 through a second heating bus 32.

The first heating bus 31 includes at least a first line segment L1 located on the first side A1. The second heating bus 32 includes at least a second line segment L2 located on the first side A1. The first line segment L1 and the second line segment L2 extend along the second direction D2.

FIG. 1 illustrates the display device of the present disclosure by taking the display device having a rectangular structure as an example and does not limit the actual shape of the display device. In some other embodiments of the present disclosure, the display device may also be in another shape, such as a circular shape, an oval shape, or a non-rectangular special-shaped structure.

In order to clearly illustrate the content of the present disclosure, FIG. 1 only shows the heating wires 10 in the display area AA. Although not shown in the drawing, in order to realize a display function, the display area AA of the display panel 100 may also include a plurality of signal lines, such as gate lines, data lines, clock signal lines, etc. In addition, pixel circuits may be also arranged in the display area AA, and drive circuits may be also arranged in the non-display area NA.

Figure 2:
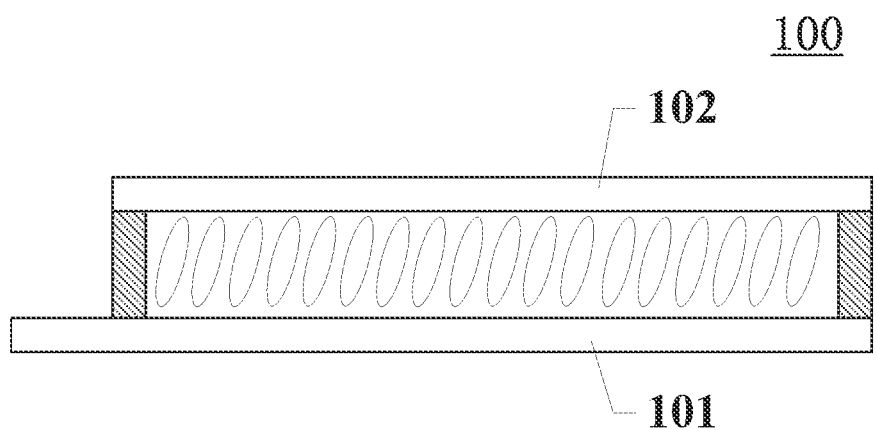
FIG. 2 is a schematic diagram showing a film layer of the display panel according to some embodiments of the present disclosure.

In some embodiments, the display panel 100 of embodiments of the present disclosure may include a liquid crystal display panel 100. FIG. 2 is a schematic diagram showing a film layer of the display panel 100 according to some embodiments of the present disclosure. The display panel 100 includes an array substrate 101, a color film substrate 102, and liquid crystal molecules arranged between the array substrate 101 and the color film substrate 102. The heating wires 10 of embodiments of the present disclosure may be arranged on the array substrate 101, on the color film substrate 102, or on both the array substrate 101 and the color film substrate 102. With such arrangements, the liquid crystal may be heated in a low-temperature environment, which meets a use requirement of the display panel 100 in a low-temperature environment. The display panel of embodiments of the present disclosure may be not limited to the liquid crystal display panel. For example, the display panel may include an electrophoretic display panel.

Refer still to FIG. 1, in embodiments of the present disclosure, compared to a manner of arranging a heater outside of the display panel in the existing technology, the heating wires 10 are closer to the liquid crystal molecules by arranging the heating wires 10 in the display panel 100. In a low-temperature display phase, the heating wires 10 may be configured to heat the liquid crystal molecules in the display panel. The heating wires 10 of embodiments of the present disclosure may be connected in parallel between a first heating bus 31 and a second heating bus 32. A DC voltage or a DC current may be supplied to the heating wire 10 through the first signal end 01 and the second signal end 02 of the heating wire 10. When the DC voltage or the DC current is supplied to the heating wire 10, the heating wire 10 may be heated up by the DC voltage or the DC current. The heat of the heating wire 10 may directly act on the liquid crystal molecules to heat the liquid crystal molecules in the display panel, which may be beneficial to improve a heating speed and satisfies a normal use requirement of a display product in a low-temperature environment. Compared to the existing technology of introducing externally the heater, the solution of arranging the heating wires 10 in the display panel may significantly simplify the structure of the product. In addition, in the low-temperature environment, the display panel may be continuously heated as needed to keep the liquid crystal molecules at a suitable working temperature to reduce viscous resistance of the liquid crystal molecules and improve a state change speed of the liquid crystal molecules. Thus, the solution of embodiments of the present disclosure may be beneficial to improve a tailing phenomenon of the display image to improve the display quality of the product.

Further, in the present invention, the first signal end 01 and the second signal end 02 of each heating wire 10 are arranged on the first side A1 of the display area AA. The first line segment L1 of the first heating bus 31 and the second line segment L1 of the second heating bus line 31 are arranged on the first side A1 of the display area AA. On the first side A1, first signal ends 01 of the plurality of heating wires 10 may be electrically connected to the first line segment L1. Second signal ends 02 of the plurality of heating wires 10 may be electrically connected to the second line segment L2. Compared to a manner of connecting the first signal ends 01 of different heating wires 10 to different wires, or connecting the second signal ends 02 of different heating wires 10 to different wires, connecting the first signal ends 01 to the first line segment L1 and the second signal ends 02 to the second line segment L2 may effectively reduce a number of signal lines on the display panel 100, significantly simplify a wiring structure of the display panel 100, and be beneficial to simplify a manufacturing process and save cost. In addition, in embodiments of the present disclosure, by arranging the first signal end 01 and the second signal end 02 corresponding to each heating wire 10 on the same side, impedances of loops where the heating wires 10 are located may be approximately the same. Thus, effective power obtained by the heating wires 10 may be substantially consistent, which is beneficial to achieving a uniform heating effect for the display area by different heating wires 10. In addition, by arranging the first signal end 01 and the second signal end 02 of the heating wire 10, the first line segment L1, and the second line segment L2 on the first side A1 of the display area AA, frame space of the display panel 100 may also be appropriately used, which is beneficial to realize a narrow frame design.

The heating wires 10 shown in FIG. 1 are for illustration and do not represent the actual number of heating wires included in the display panel 100. In addition, FIG. 1 only shows that the first signal end 01 and the second signal end 02 of the heating wire 10 are arranged on the first side A1 of the display area along the first direction, and the first voltage terminal 21 and the second voltage terminal 22 are arranged on the second side A2 of the display area along the first direction. However, in some other embodiments of the present disclosure, the first signal end 01 and the second signal end 02 and the heating wire 10, the first voltage terminal 21, and the second voltage terminal 22 may also be arranged in the non-display area on the same side of the display area, which will be described in detail below.

In some embodiments, in the display panel 100 of embodiments of the present disclosure, both the first heating bus 31 and the second heating bus 32 may be arranged in the non-display NA of the display panel 100 to avoid affecting a screen ratio of the display panel 100.

Refer still to FIG. 1, in some embodiments of the present disclosure, the first voltage terminal 21 and the second voltage terminal 22 are arranged on the second side A2 of the display area AA along the first direction D1. The second side A2 is opposite to the first side A1.

In the display panel 100 of embodiments of the present disclosure, the first voltage terminal 21 that provides a heating drive signal to the first heating bus 31 and the second voltage terminal 22 that provides a heating drive signal to the second heating bus 32 are arranged on the second side A2 of the display area AA along the first direction D1. Thus, the first voltage terminal 21 and the second voltage terminal 22 are arranged opposite to the first signal end 01 and the second signal end 02 of the heating wire 10. In practical applications, the first voltage terminal 21 and the second voltage terminal 22 may be electrically connected to an external circuit through a flexible circuit board. The heating drive signal may be provided to the first voltage terminal 21 and the second voltage terminal 22 through the external circuit to further transmit the heating drive signal to the heating wires 10. In embodiments of the present disclosure, when the first voltage terminal 21 and the second voltage terminal 22 are arranged on the second side A2 of the display panel 100, the first voltage terminal 21 and the second voltage terminal 22 may be electrically connected to a same flexible circuit board 103. Thus, it is beneficial to reduce the number of flexible circuit boards 103 bound to the display panel 100, simplify the manufacturing process of the product, and achieve the narrow frame effect.

Figure 3:
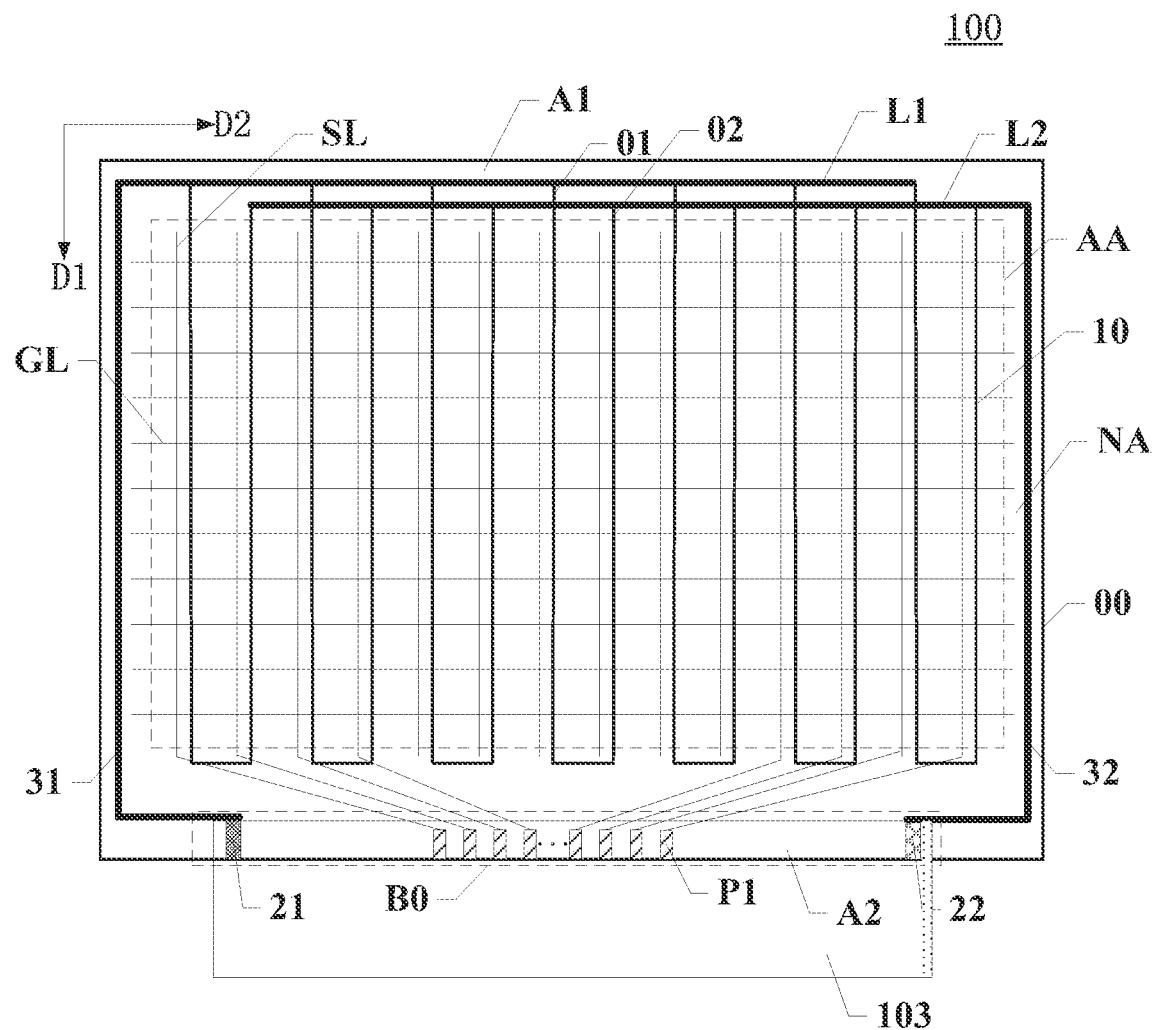
FIG. 3 is a schematic top view of another display panel according to some embodiments of the present disclosure.

FIG. 3 is a top view of another display panel 100 according to some embodiments of the present invention. Refer to FIG. 3, in some embodiments of the present disclosure, the display panel 100 further includes at least gate lines GL and data lines DL arranged in the display area AA, and a bonding area B0 arranged on the second side A2. The first voltage terminal 21 and the second voltage terminal 22 are arranged in the bonding area B0. The bonding area B0 includes a plurality of first conductive pads P1. The first conductive pads P1 are electrically connected to the gate lines GL and/or the data lines DL. The first voltage terminal 21, the second voltage terminal 22, and the first conductive pads P1 are electrically connected to the same flexible circuit board 103.

In some embodiments, FIG. 3 shows the gate lines GL and the data lines DL of the display panel 100. In some embodiments, an area defined by two neighboring gate lines GL and two neighboring data lines DL may be a pixel area. When the gate lines GL provide a turn-on signal to the pixel area, liquid crystal molecules corresponding to the pixel area may deflect in response to the signal of the data lines DL to realize an image display function of the display panel 100. In embodiments of the present disclosure, the non-display NA of the display panel 100 includes the bonding area B0. The bonding area B0 is located on the second side A2. The plurality of first conductive pads P1 are arranged in the bonding area B0. The first conductive pads P1 are configured to be electrically connected to the gate lines GL and/or the data lines DL and provide a scan signal to the gate lines GL and/or provide a data signal to the data lines DL to drive the liquid crystal molecules. In embodiments of the present disclosure, the first voltage terminal 21 and the second voltage terminal 22 are arranged in the bonding area B0 to cause the first voltage terminal 21, the second voltage terminal 22, and the first conductive pads P1 to be electrically connected to the same flexible circuit board. That is, a flexible circuit board for display and a flexible circuit board for heating may share a same flexible circuit board. Thus, the narrow frame effect may be achieved, and the number of the flexible circuit boards bonded to the display panel 100 may be reduced, and the complexity of the bonding process may be simplified. Therefore, the production efficiency may be improved.

In embodiments of the present disclosure, the first side A1 is located in an upper frame area of the display panel 100, and the second side A2 is located in a lower frame area of the display panel 100. When the bonding area B0 is arranged in the lower frame area of the display panel 100, since the gate lines GL and/or the data lines DL may be electrically connected to the first conductive pads P1 in the bonding area B0 through a fan-out wiring. Thus, wiring space of the second side A2 of the display panel 100 may be limited, and space of the first side A1 opposite to the second side A2 may be relatively sufficient. Thus, in the present disclosure, the first signal end 01 and the second signal end 02 of each heating wire 10 of the plurality of heating wires 10 may be arranged on the first side A1 of the display panel 100. The first line segment L1 and the second line segment L2 on the first side A1 may be configured to be electrically connected to the first signal end 01 and the second signal end 02, respectively, which is beneficial to rationally utilize the space of the display panel 100 and avoids a phenomenon of an increased frame width caused by arranging the first signal end 01 and the second signal end 02 on the second side A2. Therefore, in embodiments of the present disclosure, the solution of arranging the first signal end 01 and the second signal end 02 of the heating wire 10 on the first side A1 of the display panel 100 may be beneficial to realize the narrow frame design of the display panel 100.

Figure 4:
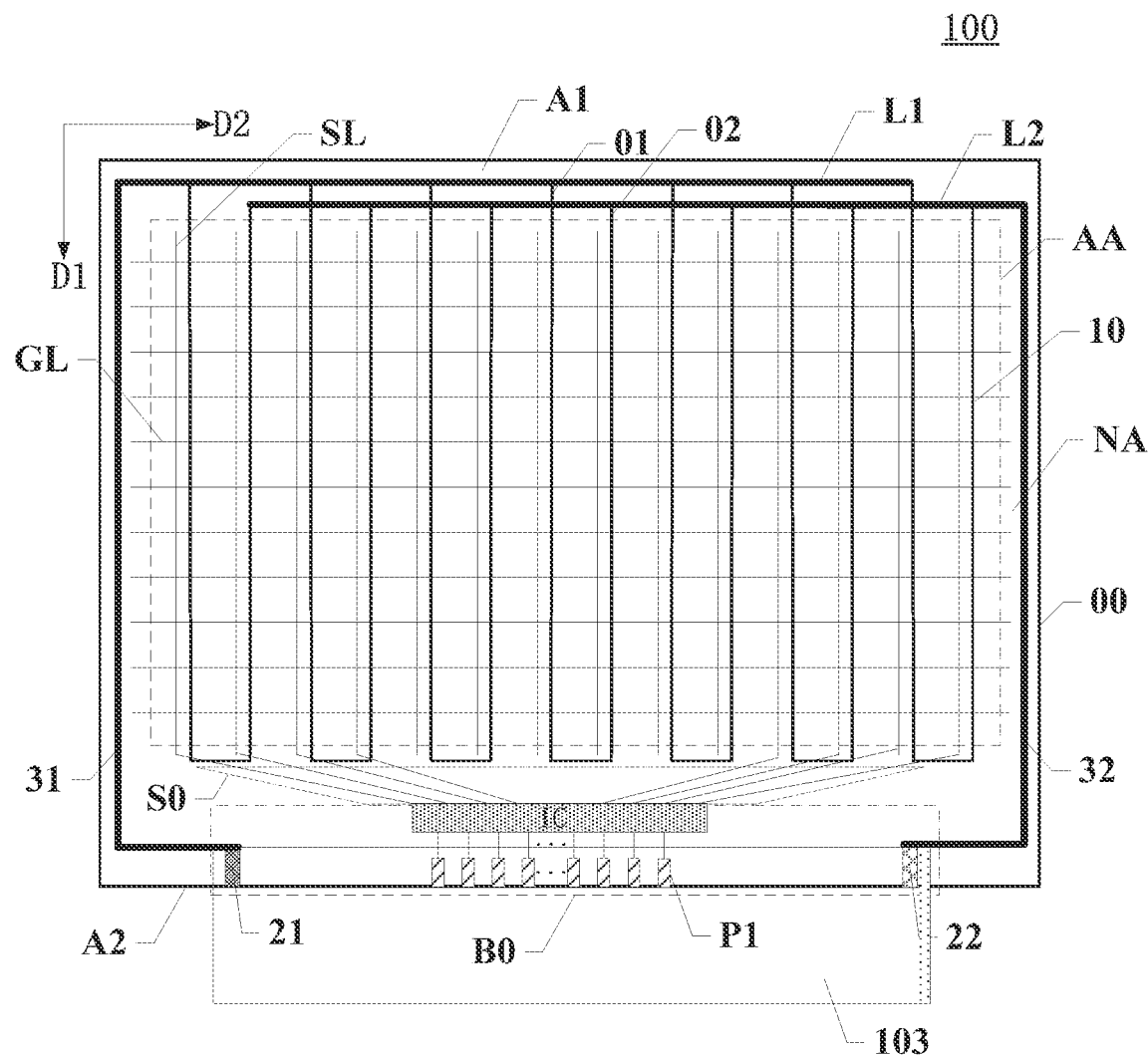
FIG. 4 is a schematic top view of another display panel according to some embodiments of the present disclosure.

FIG. 4 is a schematic top view of another display panel 100 according to some embodiments of the present disclosure. In embodiments of the present disclosure, a control chip IC is arranged in the bonding area B0 of the display panel 100.

Refer to FIG. 4, in embodiments of the present disclosure, the bonding area B0 further includes the control chip IC. The first conductive pads P1 may be electrically connected to the gate lines GL and/or the data lines DL through the control chip IC.

In embodiments of the present disclosure, the control chip IC may be bonded to the bonding area B0 of the display panel 100. In some embodiments, in the bonding area B0, the control chip IC may be arranged between the first conductive pads P1 and the display area AA. The control chip IC may be electrically connected to the gate lines GL and/or the data lines DL, and also electrically connected to the first conductive pads P1. In some embodiments, the flexible circuit board 103 may be electrically connected to the first conductive pads P1, the first voltage terminal 21, and the second voltage terminal 22 of the bonding area B0. The flexible circuit board 103 may perform signal exchange with the control chip IC through the first conductive pads P1 and provide the heating drive signal to the first voltage terminal 21 and the second voltage terminal 22. For the solution of arranging the control chip IC on the display panel 100, the first voltage terminal 21, the second voltage terminal 22, and the first conductive pads P1 may also share the same control flexible circuit board 103, which is also beneficial to simplify the overall structure of the display panel 100.

Figure 5:
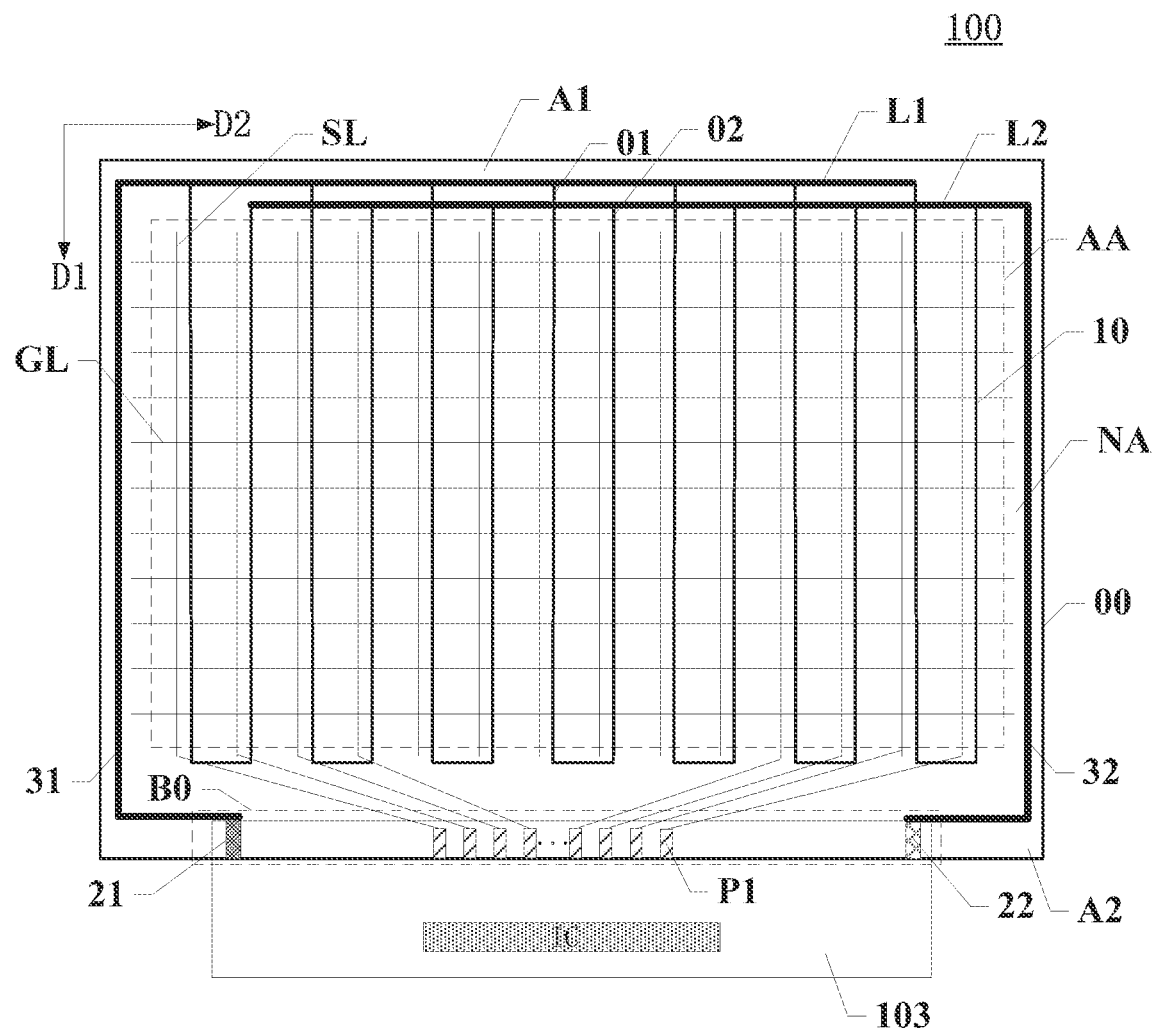
FIG. 5 is a schematic top view of another display panel according to some embodiments of the present disclosure.

FIG. 5 is a schematic top view of another display panel 100 of some embodiments of the present disclosure. In embodiments of the present disclosure, another connection relationship between the display panel 100 and the control chip IC is shown.

Refer to FIG. 5, in embodiments of the present disclosure, the control chip IC is arranged on the flexible circuit board 103. The control chip IC is electrically connected to the first conductive pads P1.

In some embodiments, FIG. 5 shows a solution that the flexible circuit board 103 is bonded to the display panel 100, and the control chip IC is arranged on the flexible circuit board 103. The control chip IC located on the flexible circuit board 103 may be electrically connected to the first conductive pads P1 of the display panel 100 through the flexible circuit board 103 to be further electrically connected to the gate lines GL and/or the data lines DL in the display area AA. In the solution, the control chip IC may not need to be arranged in the bonding area B0 of the display panel 100, which is beneficial to save the space of the bonding area B0 of the display panel 100. Thus, it is beneficial to realize the narrow frame design of the display panel 100. In addition, the first conductive pads P1 arranged in the bonding area B0 may share the same flexible circuit board 103 with the first voltage terminal 21 and the second voltage terminal 22, which is also beneficial to simplify the structure of the display panel 100.

Refer to FIG. 4 and FIG. 5, in embodiments of the present disclosure, along the second direction D2, the first voltage terminal 21 and the second voltage terminal 22 are arranged on two sides of the plurality of first conductive pads P1, respectively. The first heating bus 31 and the second heating bus 32 arranged on the second side A2 extend from different sides of the display panel 100 to the first side A1, respectively.

In some embodiments, when the first voltage terminal 21 and the second voltage terminal 22 are arranged in the bonding area B0, the first voltage terminal 21 and the second voltage terminal 22 may be arranged on two sides of the first conductive pads P1, respectively. By taking the solution of arranging the first voltage terminal 21 on the left side of the first conductive pads P1 and arranging the second voltage terminal 22 on the right side of the first conductive pads P1 as an example, the first heating bus 31 that is drawn from the first voltage terminal 21 may extend from the left frame area of the display panel 100 to the first side A1, and the second heating bus 32 that is drawn from the second voltage terminal 22 may extend from the right frame area of the display panel 100 to the first side A1. Thus, the overall length of the first heating bus 31 and the overall length of the second heating bus 32 may be substantially the same, and the load of the first heating bus 31 and the load of the second heating bus 32 may be substantially the same. Therefore, the current of each heating wire 10 in the display area AA may be substantially the same, which is beneficial to ensure the current uniformity on the heating wires 10 in the display area AA and achieve uniform heating of the display area AA of the display panel 100. In addition, since the first conductive pads P1 are electrically connected to other wires (such as data lines, etc.) of the display panel through the fan-out wires, when the first voltage terminal 21 and the second voltage terminal 22 are arranged on the two sides of the plurality of conductive pads P1, respectively, the first heating bus 31 that is drawn from the first voltage terminal 21 may be wired from the first conductive pads P1 toward the side of the left frame of the display panel, and the second heating bus 32 that is drawn from the second voltage terminal 22 may be wired from the first conductive pads P1 to the side of the right frame of the display panel. The first heating bus 31 and the second heating bus 32 may not overlap with the fan-out wire. Thus, it is beneficial to avoid the signal on the first heating bus 31 or the second heating bus 32 from affecting the signal on the fan-out wire, which is beneficial to improve the display reliability of the display panel in a low-temperature environment.

Figure 6:
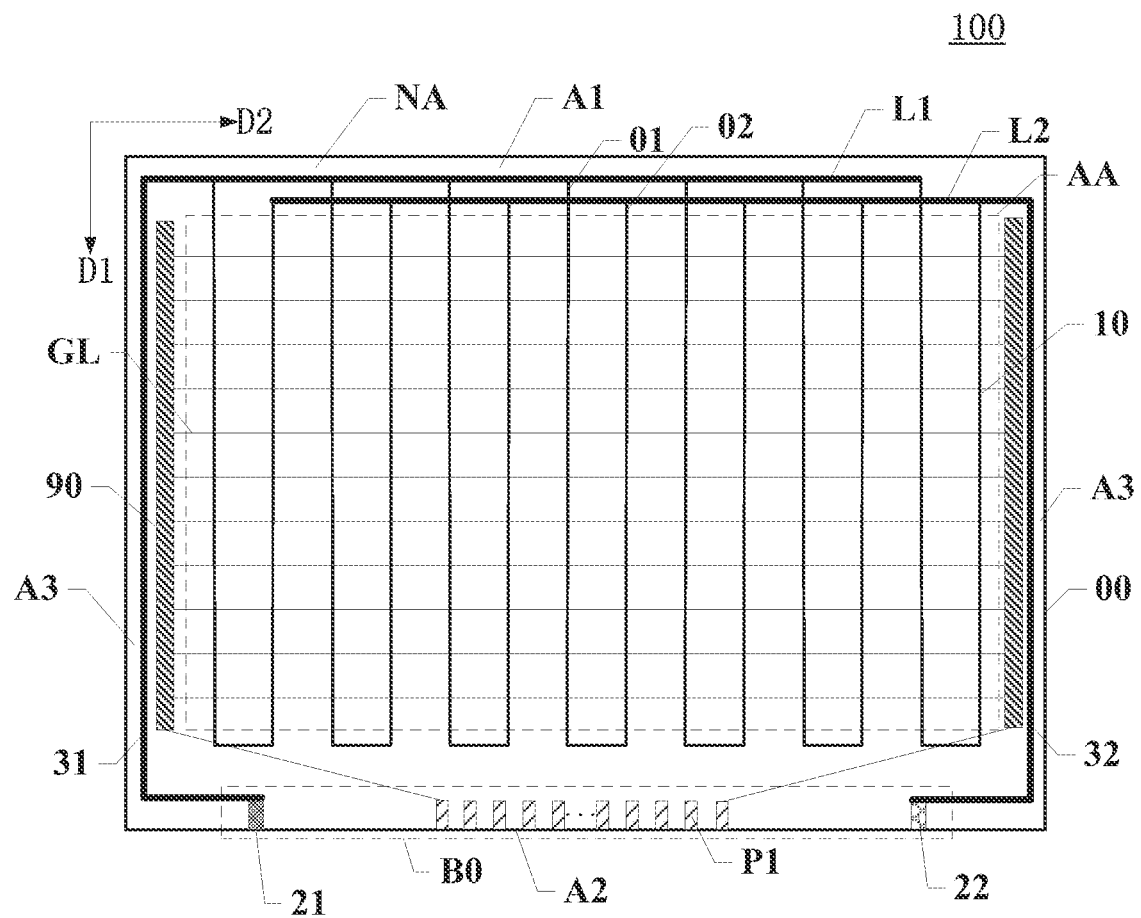
FIG. 6 is a schematic top view of another display panel according to some embodiments of the present disclosure.

FIG. 6 is a schematic top view of another display panel 100 according to some embodiments of the present disclosure. In embodiments of the present disclosure, some wires of the heating bus and a gate drive unit 90 are arranged on a same side of the display panel. The heating bus and the gate drive unit 90 may have an opposite position relationship.

Refer to FIG. 6, in embodiments of the present disclosure, the display panel 100 includes a plurality of gate lines GL and the gate drive unit 90 connected to the gate lines GL. A part of the first heating bus 31 or the second heating bus 32 and the gate drive unit 90 are arranged on the same side of the display panel 100. The first heating bus 31 or the second heating bus 32 is arranged on the side of the gate drive unit 90 away from the display area AA. Along the third direction, the first heating bus 31 does not overlap with the gate drive unit 90. The display panel 100 includes a substrate 00. The third direction is perpendicular to a plane where the substrate 00 is located.

In some embodiments, when the first heating bus 31 that is drawn from the first voltage terminal 21 extends from the second side A2 to the first side A1 along the left frame of the display panel 100, the part of the first heating bus 31 and the gate drive unit 90 may be arranged on the same side frame of the display panel 100. When the first heating bus 31 and the gate drive unit 90 are arranged on the same side frame of the display panel 100, if the first heating bus 31 and the gate drive unit 90 overlap in the direction perpendicular to the substrate 00, a capacitor may be formed between the first heating bus 31 and the gate drive unit 90. Since the first heating bus 31 is usually relatively wide, relatively many charges may be accumulated, which may cause a static electricity problem and affect the normal operation of display and heating. Therefore, when a part of the line segment of the first heating bus 31 and the gate drive unit 90 are arranged on the same side frame of the display panel 100, the first heating bus 31 may be arranged on an outer periphery of the gate drive unit 90. That is, the first heating bus 31 may be arranged on a side of the gate drive unit 90 away from the display area AA, and the first heating bus 31 and the gate drive unit 90 do not overlap in the direction perpendicular to the substrate 00 to avoid forming the capacitor between the first heating bus 31 and the gate drive unit 90 to cause the accumulation of the charges. Thus, the normal heating and display operation of the display panel 100 may be ensured.

Similarly, when the second heating bus 32 that is drawn from the second voltage terminal 22 extends from the second side A2 to the first side A1 along the side frame of the display panel 100, a part of the second heating bus 32 and the gate drive unit 90 may be arranged on a same side frame. When the second heating bus 32 and the gate drive unit 90 are arranged on the same side frame of the display panel 100, if the second heating bus 32 and the gate drive unit 90 overlap with each other in the direction perpendicular to the substrate 00, a capacitor may be formed the second heating bus 32 and the gate drive unit 90. Since the second heating bus 32 is usually relatively wide, many charges may be accumulated, which may cause a static electricity problem and affect the normal operation of display and heating. Thus, when the part of the line segment of the second heating bus 32 and the gate drive unit 90 are arranged on the same side frame of the display panel 100, the second heating bus 32 may be arranged on an outer periphery of the gate drive unit 90. That is, the second heating bus 32 may be arranged on a side of the gate drive unit 90 away from the display area AA, and the second heating bus 32 and the gate drive unit 90 may be caused to not overlap in the direction perpendicular to the substrate 00 to avoid the formation of the capacitor between the second heating bus 32 and the gate drive unit 90 to cause the accumulation of the charges. Thus, the normal heating and display operation of the display panel 100 may be ensured.

In some embodiments, FIG. 6 shows a situation in which gate drive units 90 are arranged at the positions of the left and right frames of the display panel 100. Thus, the gate drive units 90 may perform bilateral driving or unilateral driving on the gate lines GL. That is, the gate drive unit 90 located at the position of the left frame is electrically connected to a part of the gate lines GL to drive the part of the gate lines GL, and the gate drive unit 90 located at the position of the right frame is electrically connected to another part of the gate lines GL to drive the other part of the gate lines GL. In some other embodiments of the present disclosure, the gate drive unit 90 may also be arranged only at the position of the left frame or the position of the right frame of the display panel 100. Thus, the gate drive unit 90 may only be arranged on a same side frame with the first heating bus 31 or the second heating bus 32, which is not shown one by one in the present disclosure.

The gate drive unit 90 in embodiments of the present disclosure may include a circuit formed by a plurality of cascaded shift registers. In some embodiments, an output end of each shift register may be connected to a gate line GL. In some other embodiments of the present disclosure, the gate drive unit 90 may also include a gate drive chip. The same gate drive chip may be electrically connected to a plurality of gate lines GL, which is not limited in the present disclosure.

Refer still to FIG. 6, in embodiments of the present disclosure, the gate drive unit 90 is arranged on a third side A3 of the display area AA along the second direction D2. The third side A3 is neighboring to the first side A1 and the second side A2.

In some embodiments, the first side A1 may be an upper frame position of the display panel 100. The second side A2 may be a lower frame position of the display panel 100. The third side A3 may be a left or right frame position of the display panel 100. FIG. 6 shows a solution of arranging the first signal end 01 and the second signal end 02 of the heating wire 10 on the first side A1 of the display panel 100, arranging the first conductive pads P1, the first voltage terminal 21, and the second voltage terminal 22 on the second side A2 of the display panel 100, and arranging the gate drive unit 90 on the third side A3 of the display area AA. This arrangement may be beneficial to rationally utilize the frame space of the display panel 100 and avoid a certain frame from being too wide.

Refer to FIG. 4, in embodiments of the present disclosure, the non-display NA further includes a fan-out area S0 on the second side A2. The first voltage terminal 21 and the second voltage terminal 22 are arranged on a side of the fan-out area S0 away from the display area AA. The first heating bus 31 and the second heating bus 32 on the second side A2 are arranged on the side of the fan-out area S0 away from the display area AA.

Refer still to FIG. 4, in order to realize the electrical connection between the gate lines GL and/or the data lines DL and the drive chip of the bonding area B0 or the first conductive pads P1, a fan-out area S0 is usually arranged between the display area AA and the bonding area B0. The gate lines GL and/or the data lines DL may be connected to the drive chip or the first conductive pads P1 through the fan-out wire of the fan-out area S0. When the first voltage terminal 21 and the second voltage terminal 22 are arranged in the bonding area B0 of the display panel 100, the first heating wire 10 drawn from the first voltage terminal 21 and the heating wire 10 drawn from the second voltage terminal 22 may be arranged to avoid the fan-out area S0. For example, the first heating bus 31 and the second heating bus 32 on the second side A2 are arranged on the side of the fan-out area S0 away from the display area AA, which may be beneficial to avoid the overlapping between the first heating wire 10 or the second heating wire 10 and the fan-out area S0 to affect the accuracy of the signal on the fan-out wire. Therefore, while the display area AA is heated in a low-temperature environment, the display reliability of the display panel 100 may be improved.

Figure 7:
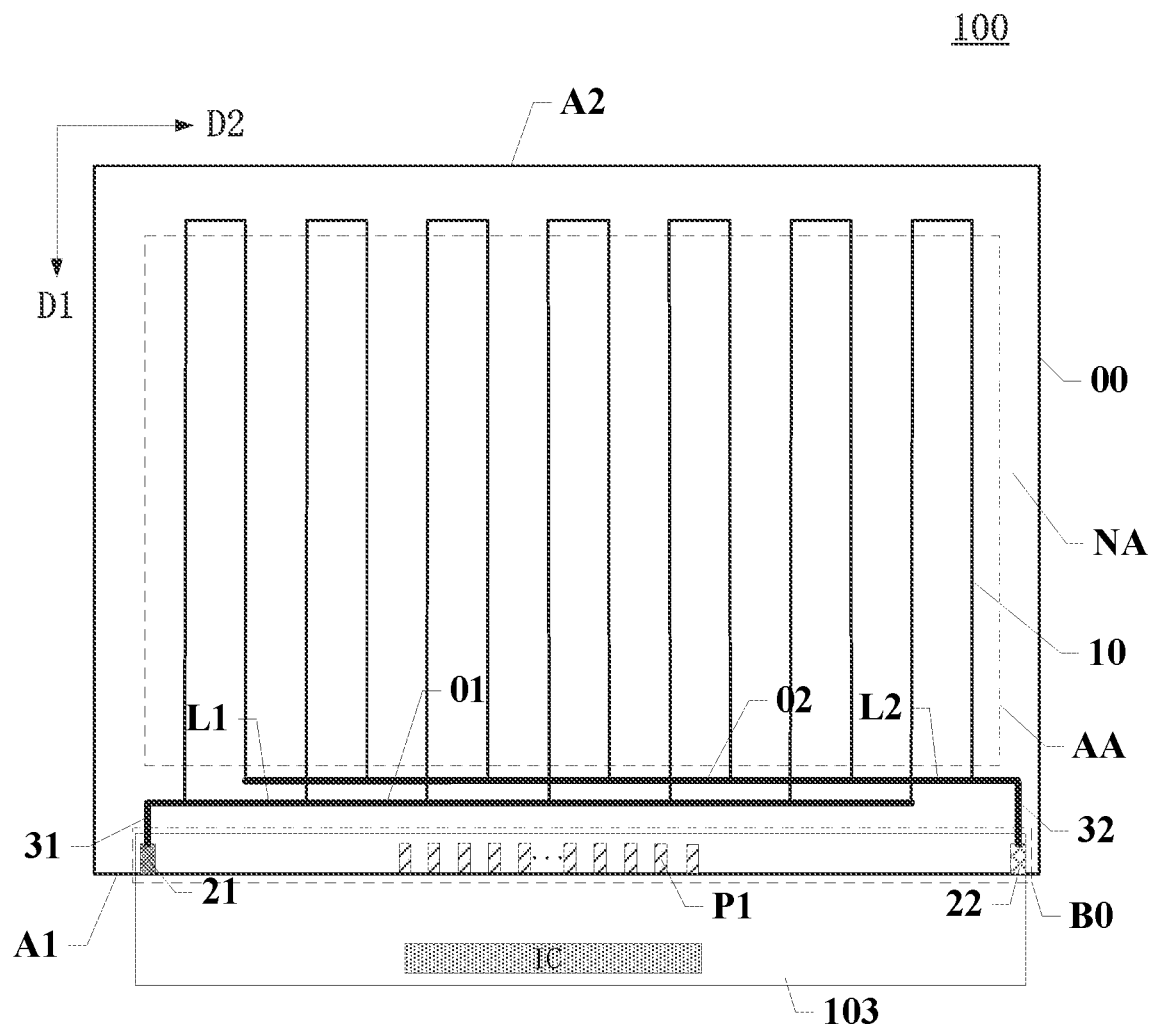
FIG. 7 is a schematic top view of another display panel according to some embodiments of the present disclosure.

FIG. 7 is a schematic top view of another display panel 100 according to embodiments of the present disclosure. When a heating function is introduced in the display panel 100, FIG. 7 shows another arrangement manner of the first voltage terminal 21, the second voltage terminal 22, the first heating bus 31, and the second heating bus 32.

Refer to FIG. 7, in embodiments of the present disclosure, the first voltage terminal 21, the second voltage terminal 22, the first heating bus 31, and the second heating bus 32 are arranged on the first side A1.

In some embodiments, since the first signal end 01 and the second signal end 02 of the heating wire 10 of the display panel 100 are arranged on the first side A1 of the display panel 100. When the first voltage terminal 21 that provides a signal to the first signal end 01, the first heating wire 10, the second voltage terminal 22 that provides the signal to the second signal end 02, and the second heating wire 10 are also arranged on the first side A1 of the display panel 100, the first voltage terminal 21, the second voltage terminal 22, the first heating bus 31, the second heating bus 32, the first signal end 01, and the second signal end 02 are arranged on the same side. Thus, the first heating wire 10 and the second heating wire 10 are arranged on the first side A1, and the first signal end 01 or the second signal end 02 may be electrically connected to the first heating wire 10 and the second heating wire 20, wiring may not need to be performed on other side frame area of the display panel 100, which effectively reduces the lengths of the first heating wire 10 and the second heating wire 10. Thus, the power consumption on the first heating wire 10 and the second heating wire 20 may be reduced, and more effective power may be obtained on the heating wire 10. Therefore, the heating efficiency of the display panel 100 may be improved. In addition, the solution of arranging the first voltage terminal 21, the second voltage terminal 22, the first heating bus 31, and the second heating bus 32 on the same side will not occupy the space of other side frames, which is beneficial to the narrow frame design of other frames and also does not affect the wiring structure of other side frame areas. In some embodiments, the first side of embodiments of the present disclosure is the lower frame area of the display panel, which is arranged on the same side with the bonding area B0. Thus, the first conductive pads P1, the first voltage terminal 21, and the second voltage terminal 22 of the bonding area B0 may share the same flexible circuit board 103. That is, the flexible circuit board for display and the flexible circuit board for heating may be integrated into the same flexible circuit board, which is beneficial to simplify the overall structure, simplify the binding process, and improve the production efficiency.

In FIG. 7, the description is made by only taking the solution of arranging the control chip IC on the flexible circuit board 103 as an example. In addition, the control chip IC may also be arranged in the bonding area B0 of the display panel, which is not limited in the present disclosure.

Figure 8:
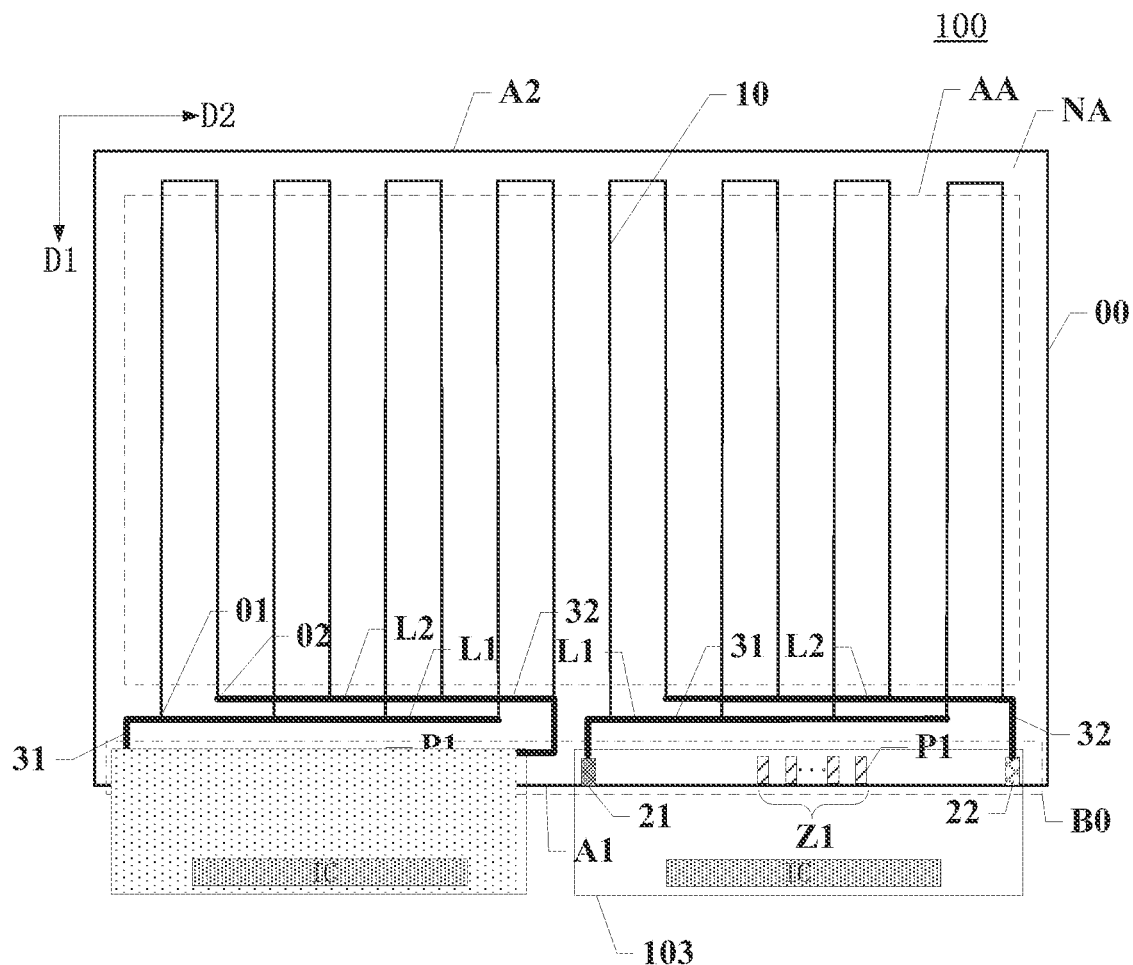
FIG. 8 is a schematic top view of another display panel according to some embodiments of the present disclosure.

FIG. 8 is a schematic top view of another display panel 100 according to some embodiments of the present disclosure. In embodiments of the present disclosure, a solution of arranging a plurality of first conductive pad groups Z1 on the display panel 100 is shown, which is suitable for the display panel 100 with a large dimension having a relatively large ratio of length and width. When the dimension of the display panel 100 is large, for example, the gate lines GL may be long, and the number of data lines DL may be large. A single control chip may be difficult to effectively drive the display panel 100 for display. Two or more control chips IC may be arranged on the display panel 100 to meet the normal display requirement of the display panel 100 with the large dimension.

Refer to FIG. 8, in embodiments of the present disclosure, the display panel 100 of embodiments of the present disclosure further includes at least the gate lines GL and data lines DL arranged in the display area AA, and the bonding area B0 on a side of the display area AA along the first direction D1. The first voltage terminal 21 and the second voltage terminal 22 are arranged in the bonding area B0. At least two first conductive pad groups Z1 may be arranged in the bonding area B0 along the second direction D2. A first conductive pad group Z1 may include a plurality of first conductive pads P1, and the first conductive pads P1 may be electrically connected to the gate lines GL and/or the data lines DL.

The bonding area B0 includes at least two first voltage terminals 21 and at least two second voltage terminals 22. At least two first voltage terminals 21 are electrically connected to the first heating bus 31. At least two second voltage terminals 22 are electrically connected to the second heating bus 32.

When the dimension of the display panel 100 is relatively large, the number of heating wires 10 arranged in the display area AA may also be large. When a first voltage terminal 21 is configured to provide heating drive signals to the plurality of heating wires 10 through the first heating bus 31, the power consumed by the first heating bus 31 may be relatively large, and the heating wires 10 may have a relatively low heating efficiency on the display area AA. When at least two first voltage terminals 21 are introduced to be electrically connected to the first heating bus 31, the two first voltage terminals 21 may simultaneously provide the heating drive signals to the first heating bus 31, which is beneficial to improving heating drive capability and heating efficiency. In addition, in embodiments of the present disclosure, the heating wires 10 are in a parallel relationship. When the two first voltage terminals 21 are arranged, a bilateral drive mode may be formed. The first heating bus 31 connected to the two first voltage terminals 21 may be also in a parallel relationship. Thus, the total impedance of the first heating bus 31 may be reduced, the heating wiring 10 may obtain more effective power, which is more beneficial to improve the heating efficiency of the heating wire 10 to the display area AA.

Similarly, when one second voltage terminal 22 is configured to provide heating drive signals to a plurality of heating wires 10 through the second heating bus 32, the power consumed by the second heating bus 32 may be relatively large, and the heating efficiency of the heating wires 10 to the display area AA may be relatively low. When at least two second voltage terminals 22 are introduced to be electrically connected to the second heating bus 32, the two second voltage terminals 22 may simultaneously provide heating drive signals to the second heating bus 32, which is beneficial to improving heating drive capability and heating efficiency. In addition, in embodiments of the present disclosure, the heating wires 10 are in a parallel relationship. When two second voltage terminals 22 are provided, a bilateral drive manner may be formed. The second heating buses 32 connected to the two second voltage terminals 22 may be also in a parallel relationship. Thus, the total impedance of the second heating buses 32 may be reduced, which is beneficial to reducing the power consumed by the second heating buses 32. Thus, the heating wires 10 may obtain more effective power, which is more beneficial to improving the heating efficiency of the heating wires 10 to the display area AA.

FIG. 8 only shows a solution of arranging two first conductive pad groups Z1 and two flexible circuit boards 103 in the bonding area B0. In some other embodiments of the present disclosure, the number of the first conductive pad groups Z1 and the flexible circuit boards 103 arranged in the bonding area B0 may also be three or more, which is not limited in the present disclosure.

In some embodiments, when the control chips are arranged on the display panel 100, the control chips may be in a one-to-one correspondence to the first conductive pad groups Z1, and the control chips may be bounded at the positions of the first conductive pad groups Z1. When the control chips are arranged on the flexible circuit boards 103, the first conductive pad groups may be configured to be bonded to the flexible circuit boards 103. The control chips on the flexible circuit boards 103 may be electrically connected to the gate lines GL and/or the data lines DL in the display area AA through the flexible circuit boards 103.

Refer still to FIG. 8, in embodiments of the present disclosure, the first voltage terminal 21 and the second voltage terminal 22 are arranged on two sides of the first conductive pad groups Z1 along the second direction D2, respectively.

In some embodiments, when the bonding area B0 includes the two first conductive pad groups Z1, the first voltage terminal 21 and the second voltage terminal 22 may be arranged on the two sides of each of the first conductive pad groups Z1. The first voltage terminals 21 at different positions may simultaneously provide the drive signals to the first heating bus 31, and the second voltage terminals 22 at different positions may simultaneously provide the drive signal to the second heating bus 32. On one hand, the driving capability of the heating wires 10 may be improved. On another hand, the uniformity of the heating drive signals received by the heating wires 10 of different areas may be ensured.

In some embodiments, refer still to FIG. 8, when the two first conductive pad groups Z1 are arranged on the display panel 100, two first voltage terminals 21 and two second voltage terminals 22 may be arranged on two sides of each of the two first conductive pad groups Z1 along the second direction D2, respectively. The two first voltage terminals 21 may be connected to the same first heating bus 31. The two second voltage terminals 22 may be connected to the same second heating bus 32. Thus, the drive capability to the heating wires may be improved. In some embodiments, the two first conductive pad groups Z1 may correspond to the two first heating buses 31 and two second heating buses 32. The signals of the first voltage terminals 21 at different positions may be the same, and the signals of the second voltage terminals 22 at different positions may be the same.

Figure 9:
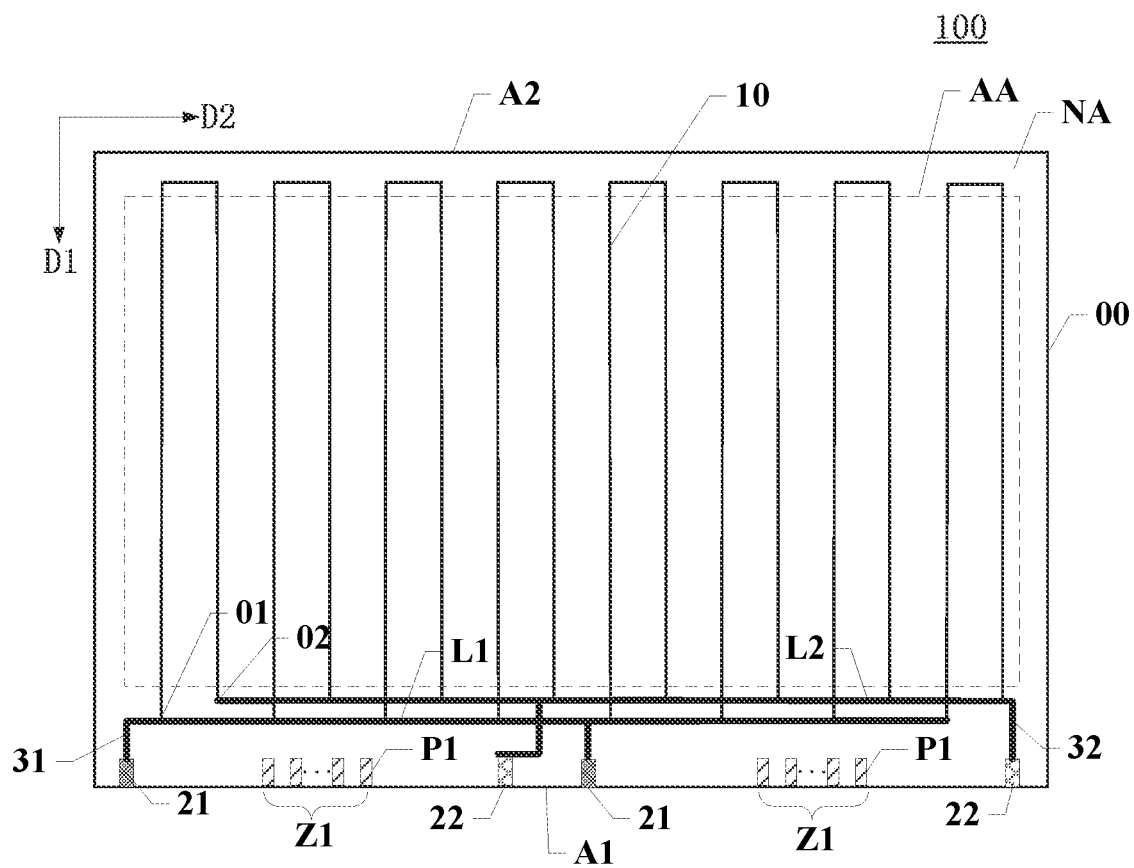
FIG. 9 is a schematic top view of another display panel according to some embodiments of the present disclosure.

FIG. 9 is a schematic top view of another display panel 100 according to some embodiments of the present disclosure. Refer to FIG. 9, in embodiments of the present disclosure, the first voltage terminals 21 are connected to the same first heating bus 31, and the second voltage terminals 22 are connected to the same second heating bus 32.

Refer to FIG. 9, when two first conductive pad groups Z1 are arranged in the bonding area, the two flexible circuit boards are arranged to be bonded to different first conductive pad groups Z1, respectively. In some other embodiments of the present disclosure, if the manufacturing process allows, the two first conductive pad groups Z1, the first voltage terminal 21, and the second voltage terminal 22 may be bonded to the same flexible circuit board to simplify the bonding process.

Refer still to FIG. 9, when the two first conductive pad groups Z1 are arranged on the display panel 100, the first voltage terminal 21 and the second voltage terminal 22 may be arranged on two sides of a same first conductive pad group Z1, respectively. The first voltage terminal 21 and the second voltage terminal 22 may have another connection relationship with the first heating bus 31 and the second heating bus 32. In some embodiments, a first heating bus 31 and a second heating bus 32 may be arranged on the first side A1 of the display panel 100. The plurality of first voltage terminals 21 may be all electrically connected to the same first heating bus 31. The plurality of second voltage terminals 22 may be electrically connected to the same second heating bus 32. On the first side A1, the first heating bus 31 may include a plurality of sub-line segments that are drawn from the first voltage terminals 21 in addition to the first line segment L1 extending along the second direction D2. These sub-line segments may be in a parallel relationship, which is beneficial to reduce the overall impedance of the first heating bus 31, reduce the power consumption on the first heating bus 31, and improve the effective power transmitted to the heating wires 10. Similarly, on the second side A2, the second heating bus 32 may include a plurality of sub-line segments that are drawn from the second voltage terminals 22 in addition to the second line segment L2 extending along the second direction D2. These sub-line segments may be in a parallel relationship, which is beneficial to reduce the overall impedance of the second heating bus 32, reduce the power consumption on the second heating bus 32, and improve the effective power transmitted to the heating wires 10. Therefore, by connecting the plurality of first voltage terminals 21 to the same first heating bus 31 and connecting the plurality of second voltage terminals 22 to the same second heating bus 32, the heating efficiency of the heating wires 10 to the crystal molecules of the display panel 100 may be improved. In addition, such a connection manner may also be beneficial to ensure the uniformity of the heating drive signals obtained by different heating wires 10 to achieve uniform heating of the display area AA.

Figure 10:
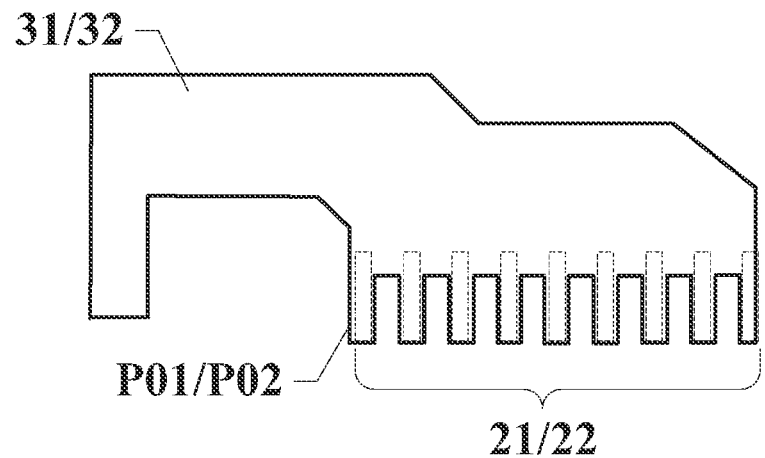
FIG. 10 is a schematic diagram showing a connection of a first heating bus and a first heating pad according to some embodiments of the present disclosure.

FIG. 10 shows a schematic diagram of a connection between the first heating bus 31/the second heating bus 32 and a first heating pad P01/a second heating pad P02. In some embodiments, in FIG. 10, description is made by taking an example of arranging the first heating bus 31 and the first heating pad P01 on a same layer or the second heating bus 32 and the second heating pad P02. In connection with FIG. 3 and FIG. 10, in embodiments of the present disclosure, the first voltage terminal 21 includes a plurality of first heating pads P01, and the second voltage terminal 22 includes a plurality of second heating pads P02. The first heating bus 31 is electrically connected to the plurality of first heating pads P01, and the second heating bus 32 is electrically connected to the plurality of second heating pads P02.

In embodiments of the present disclosure, the drive signal may be transmitted by electrically connecting the flexible circuit board 103 to the first voltage terminal 21 and the second voltage terminal 22. A dotted rectangle in FIG. 10 shows a position corresponding to the first heating pads P01 or the second heating pads P02 connected to the first voltage terminal 21 or the second voltage terminal 22 on the flexible circuit board 103. Since current carrying capacity of the flexible circuit board 103 is limited, if the first voltage terminal 21 or the second voltage terminal 22 includes only one heating pad, the current on the bus may be too large. In embodiments of the present disclosure, a plurality of first heating pads P01 are arranged on the first voltage terminal 21, and a plurality of second heating pads P02 are arranged on the second voltage terminal 22. When the flexible circuit board 103 is electrically connected to the first voltage terminal 21 and the second voltage terminal 22, it is beneficial to shunt the current on the flexible circuit board 103 to adapt to the current carrying capacity of the flexible circuit board 103 and protect the normal operation of the heating circuit.

In some embodiments, when the first heating bus 31 is electrically connected to a plurality of first heating pads P01, the signals transmitted on the first heating pads P01 may be the same. When the second heating bus 32 is electrically connected to the plurality of second heating pads P02, the signals transmitted on the second heating pads P02 may also be the same.

In the present disclosure, the number of the first heating pads P01 connected to the first heating bus 31 may not be limited, and the number of the second heating pads P02 connected to the second heating bus 32 may also not be limited. For the arrangement of the second heating pads P02, reference may be made to the arrangement of the first heating pads P01 in embodiments of the present disclosure, which is not limited in the present disclosure. FIG. 10 only illustrates the shapes of the first heating pads P01 and the second heating pads P02 by using the heating pads with a rectangular structure, and does not limit the actual shape of the heating pads. In some other implementations of the present disclosure, the shape of the heating pads may also be in other shapes.

Refer still to FIG. 3, in embodiments of the present disclosure, the materials of the first heating bus 31 and the second heating bus 32 are the same. A ratio of a difference between the lengths of the first heating bus 31 and the second heating bus 32 to a length of a longer one of the first heating bus 31 or the second heating bus 32 may be a, a≤10%.

In the display panel 100 of embodiments of the present disclosure, when the materials of the first heating bus 31 and the second heating bus 32 are the same, it is beneficial to simplify the types of the film layer materials on the display panel 100 to simplify the manufacturing process. Moreover, when the materials of the first heating bus 31 and the second heating bus 32 are the same, the impedances of the first heating bus 31 and the second heating bus 32 may be the same when the cross-section areas of the first heating bus 31 and the second heating bus 32 are the same. In some embodiments, a length difference between the first heating bus 31 and the second heating bus 32 may be set within 10%. Thus, an impedance difference between the first heating bus 31 and the second heating bus 32 may be relatively small. Therefore, the loop impedance of each heating wire 10 may be consistent or substantially the same, and the heating uniformity to the display area AA may be improved.

When the first voltage terminal 21, the second voltage terminal 22, the first signal end 01, and the second signal end 02 are arranged on the first side A1, for example, as shown in FIG. 8, the first voltage terminal 21 may also include the plurality of first heating pads P01 as shown in FIG. 10, and the second voltage terminal 22 may also include the plurality of second heating pads P02, which are not repeated here.

Refer still to FIG. 3 to FIG. 9, in embodiments of the present disclosure, the first voltage terminal 21 is a positive voltage terminal, and the second voltage terminal 22 is a negative voltage terminal. The second voltage terminal 22 is connected to a ground end of the display panel 100.

In embodiments of the present disclosure, when the second voltage terminal 22 is used as the ground end of the display panel 100, a new voltage signal may not need to be introduced for the second voltage terminal 22, and the ground signal on the display panel 100 may be reused. The types of signal ends on the display panel 100 may be reduced, and the control complexity of the display panel 100 may be simplified.

In some other embodiments of the present disclosure, refer to FIG. 3 to FIG. 10, the first voltage terminal 21 may also be a negative voltage terminal, and the second voltage terminal 22 may be a positive voltage terminal. The first voltage terminal used as the negative voltage terminal may be connected to the ground end of the display panel 100.

Figure 11:
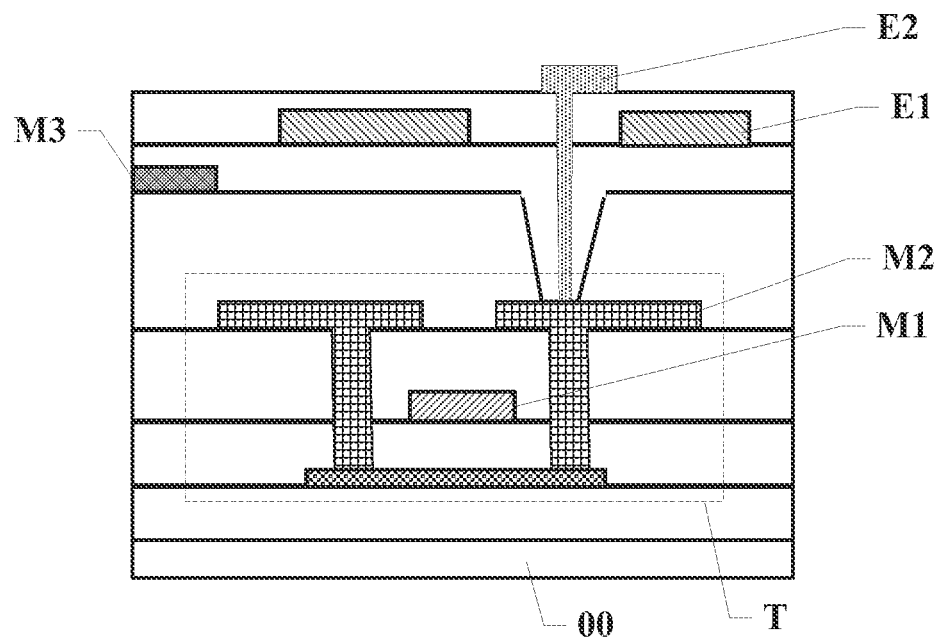
FIG. 11 is a schematic diagram showing a film layer of a display area in the display panel according to embodiments of the present disclosure.
Figure 12:
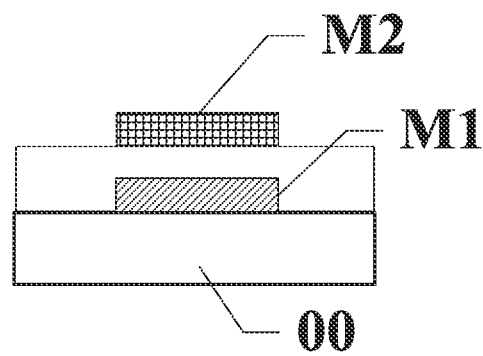
FIG. 12 is a schematic structural diagram showing a film layer of a heating bus in the display panel according to embodiments of the present disclosure.

FIG. 11 is a schematic diagram of a film layer of the display area in the display panel according to some embodiments of the present disclosure. FIG. 12 is a schematic structural diagram of a film layer of the heating bus in the display panel 100 according to some embodiments of the present disclosure. In embodiments of the present disclosure, the display panel 100 includes a substrate 00, and a gate metal layer M1 and a source-drain metal layer M2 formed on the substrate 00. The gate metal layer M1 is formed between the substrate 00 and the source-drain metal layer M2.

In connection with FIG. 1 to FIG. 12, the first heating bus 31 and the second heating bus 32 are arranged on the gate metal layer M1, or the first heating bus 31 and the second heating bus 32 are arranged on the source-drain metal layer M2, or one of the first heating bus 31 and the second heating bus 32 is arranged on the gate metal layer M1, and the other one first heating bus 31 and the second heating bus 32 is arranged on the source-drain metal layer M2.

In some embodiments, in connection with FIG. 1 to FIG. 12, the display panel 100 includes a plurality of metal layers and insulation layers. In order to realize the display function, for example, as shown in FIG. 11, the display panel 100 includes a plurality of transistors T. One transistor T of the plurality of transistors T includes a gate electrode, an active layer, and a source-drain electrode. The metal layer where the gate electrode is located may include the gate metal layer M1, and the metal layer where the source-drain electrode is located may include the source-drain metal layer M2. The gate metal layer M1 is formed on a side of the source-drain metal layer M2 facing the substrate 00. In some embodiments, the display area of the display panel further includes a public electrode E1 and a pixel electrode E2. The pixel electrode E2 is electrically connected to the source or drain of the transistor T. FIG. 12 shows a film layer structure of the heating bus in the display panel 100. When the first heating bus 31 and the second heating bus 32 are arranged on the display panel 100, the first heating bus 31 and the second heating bus 32 may be arranged on the gate metal layer M1, or the first heating bus 31 and the second heating bus 32 may be arranged on the source-drain metal layer M2, or one of the first heating bus 31 and the second heating bus 32 may be arranged on the gate metal layer M1, and the other one of the first heating bus 31 and the second heating bus 32 may be arranged on the source-drain metal layer M2. Thus, a new film layer structure may not need to be formed for the first heating bus 31 and the second heating bus 32 on the display panel 100, and the existing gate metal layer M1 or the source-drain metal layer M2 may be reused. The first heating bus 31 or the second heating bus 32 may be formed while the gate metal layer M1 or the source-drain metal layer M2 are prepared. Thus, the manufacturing process may be simplified, and the production cost may be reduced.

Figure 13:
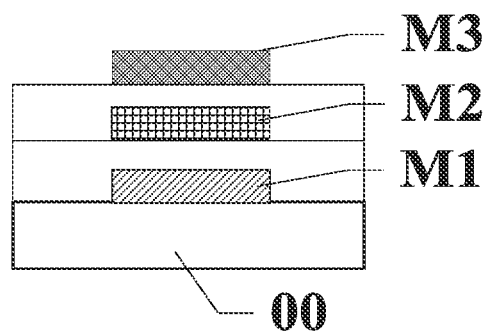
FIG. 13 is a schematic structural diagram showing another film layer of the heating bus in the display panel according to embodiments of the present disclosure.

FIG. 13 is a schematic structural diagram showing another film layer of the heating bus in the display panel according to embodiments of the present disclosure. In embodiments of the present disclosure, in connection with FIG. 1 to FIG. 11 and FIG. 13, The display panel 100 includes a substrate 00, a gate metal layer M1 formed on the substrate 00, a source-drain metal layer M2, and an auxiliary metal layer M3. The gate metal layer M1 is formed between the substrate 00 and the source-drain metal layer M2. The auxiliary metal layer M3 may be formed on a side of the gate metal layer M1 facing the substrate 00, or the auxiliary metal layer M3 may be formed on a side of the source-drain metal layer M2 away from the substrate 00. The first heating bus 31 and the second heating bus 32 may be arranged on the auxiliary metal layer M3, or, one of the first heating bus 31 and the second heating bus 32 may be arranged on the auxiliary metal layer M3, and the other one of the first heating bus 31 and the second heating bus 32 may be arranged on the gate metal layer M1 or the source-drain metal layer M2.

In some embodiments, in FIG. 13, the display panel 100 includes the auxiliary metal layer M3 in addition to the gate metal layer M1 and the source-drain metal layer M2. FIG. 13 only shows a solution of forming the auxiliary metal layer M3 on the side of the source-drain metal layer M2 away from the substrate 00. In some other embodiments of the present disclosure, the auxiliary metal layer M3 may also be formed on the side of the gate metal layer M1 facing the substrate 00.

In connection with FIG. 1 to FIG. 11 and FIG. 13, when the available space of the gate metal layer M1 or the source-drain metal layer M2 in the display panel 100 is limited, the first heating bus 31 and the second heating bus 32 may be arranged on the auxiliary metal layer M3, or one of the first heating bus 31 and the second heating bus 32 may be arranged on the auxiliary metal layer M3, and the other one of the first heating bus 31 and the second heating bus 32 may be arranged on the gate metal layer M1 or the source-drain metal layer M2 to alleviate the problem of insufficient space. Moreover, the first heating bus 31 or the second heating bus 32 disposed on the auxiliary metal layer M3 may be better insulated from other metal wires on the display panel 100 to avoid mutual interference between signals, which is beneficial to improve system stability.

In some embodiments, the auxiliary metal layer M3 on the display panel 100 may include a film layer having a touch wire or a bridge structure. Then, fewer metal wires may be arranged on the auxiliary metal layer M3, and enough space may be available to arrange the heating wires on the auxiliary metal layer M3. When the first heating bus 31 or the second heating bus 32 is arranged on the auxiliary metal layer M3, another film layer structure may not need to be arranged for the first heating bus 31 or the second heating bus 32, and the existing film layer structure may be reused. Thus, it is beneficial to simplify the film layer structure of the display panel 100 and simplify the production process of the display panel 100.

Figure 14:
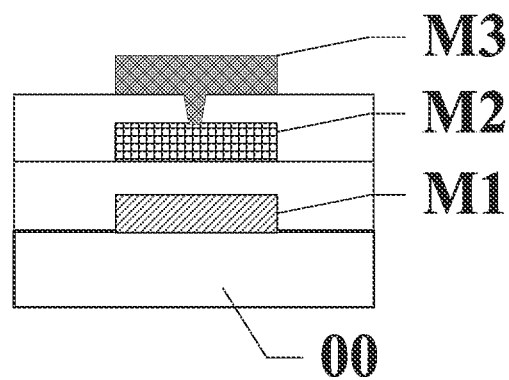
FIG. 14 is a schematic structural diagram showing another film layer of the heating bus in the display panel according to embodiments of the present disclosure.

In embodiments of the present disclosure, the first heating bus 31 may be arranged on a metal layer, or the second heating bus 32 may be arranged on a metal layer. In some other embodiments of the present disclosure, the first heating bus 31 or the second heating bus 32 may be arranged on two or more metal layers. For example, FIG. 14 is a schematic structural diagram showing another film layer of the heating bus in the display panel according to embodiments of the present disclosure. In connection with FIG. 1 to FIG. 11 and FIG. 14, in embodiments of the present disclosure, the display panel 100 includes a substrate 00, a gate metal layer M1 arranged on the substrate 00, a source-drain metal layer M2, and an auxiliary metal layer M3. The gate metal layer M1 is formed between the substrate 00 and the source-drain metal layer M2. The auxiliary metal layer M3 may be formed on the side of the gate metal layer M1 facing the substrate 00, or the auxiliary metal layer M3 may be formed on the side of the source-drain metal layer M2 away from the substrate 00.

The first heating bus 31 may be arranged on at least two of the gate metal layer M1, the source-drain metal layer M2, and the auxiliary metal layer M3, and parts of the first heating bus 31 arranged on different metal layers may be electrically connected to each other, and/or the second heating bus 32 may be arranged on at least two of the gate metal layer M1, the source-drain metal layer M2, and the auxiliary metal layer M3, and parts of the second heating bus 32 arranged on different metal layers may be electrically connected to each other.

Figure 15:
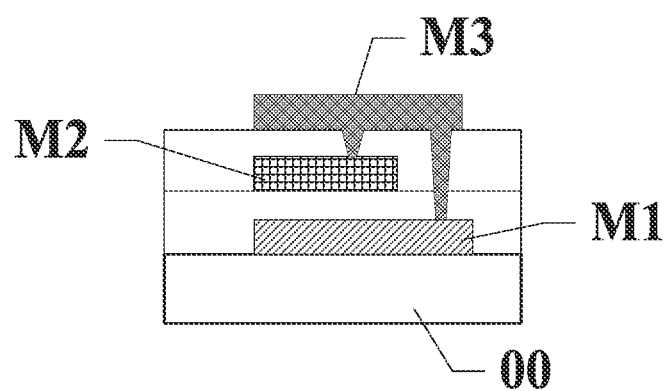
FIG. 15 is a schematic structural diagram showing another film layer of the heating bus in the display panel according to embodiments of the present disclosure.

In some embodiments, the heating wire 10 shown in FIG. 14 includes, for example, the first heating bus 31 or the second heating bus 32. By taking the first heating bus 31 as an example, in embodiments of the present disclosure, the first heating bus 31 may be arranged on the auxiliary metal layer M3 and the source-drain metal layer M2. The parts of the first heating bus 31 located in the auxiliary metal layer M3 and the source-drain metal layer M2 may be electrically connected to each other through a connection hole. In some other embodiments of the present disclosure, the first heating bus 31 may also be arranged on the source-drain metal layer M2 and the gate metal layer M1. The parts of the first heating bus 31 arranged on the source-drain metal layer M2 and the gate metal layer M1 may be electrically connected to each other through the connection hole. In some other embodiments of the present disclosure, the first heating bus 31 may also be arranged on three layers of the gate metal layer M1, the source-drain metal layer M2, and the auxiliary metal layer M3. For example, as shown in FIG. 15, parts of the first heating bus 31 arranged on the gate metal layer M1, the source-drain metal layer M2, and the auxiliary metal layer M3 may be electrically connected to each other. For example, the bridge connection method shown in FIG. 15 may be used. The part of the first heating bus 31 arranged on the auxiliary metal layer M3 may be electrically connected to the parts of the first heating bus 31 arranged on the source-drain metal layer M2 and the gate metal layer M1 through the connection holes. In addition to such a connection manner, the auxiliary metal layer M3 and the source-drain metal layer M2 may also be electrically connected through the connection hole. Then, the source-drain metal layer M2 may be electrically connected to the gate metal layer M1, which is not limited in the present disclosure. FIG. 15 shows a schematic structural diagram of another film layer of the display panel 100 according to embodiments of the present disclosure.

In connection with FIG. 1 to FIG. 11, FIG. 14, and FIG. 15, when the heating bus is distributed in two or three metal layers in embodiments of the present disclosure, the parts arranged in different metal layers may be regarded as a parallel structure, which is beneficial to reduce the overall impedance of the heating bus and reduce the power consumption on the heating bus. Thus, more effective power may be obtained on the heating bus, and the heating efficiency of the display panel may be improved.

In embodiments of the present disclosure, a description is made by taking the first heating bus 31 as an example. For the second heating bus 32 that is arranged on two or three metal layers, references may be made to the arrangement structure of the first heating bus 31 of embodiments of the present disclosure, which is not repeated here.

Figure 16:
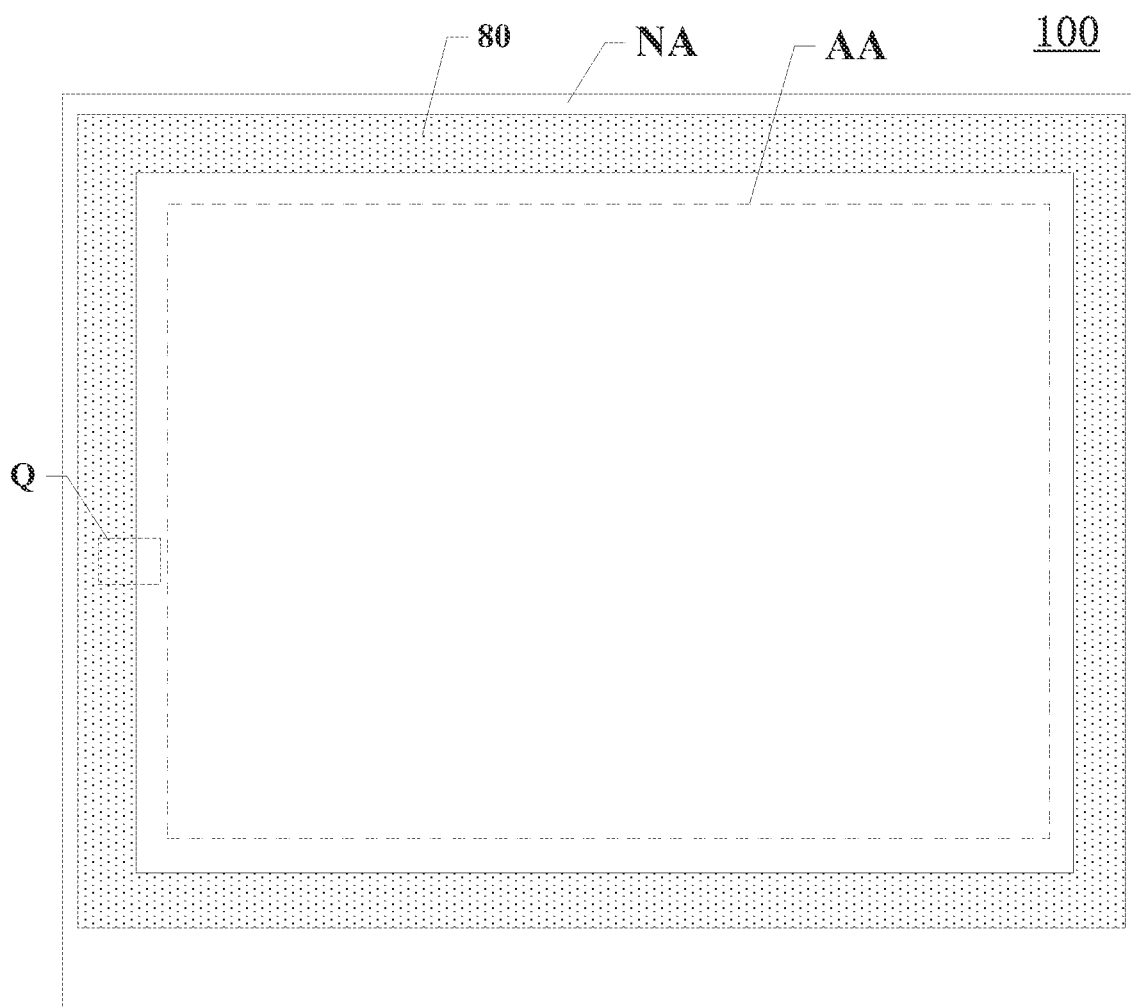
FIG. 16 is a schematic top view of another display panel according to some embodiments of the present disclosure.
Figure 17:
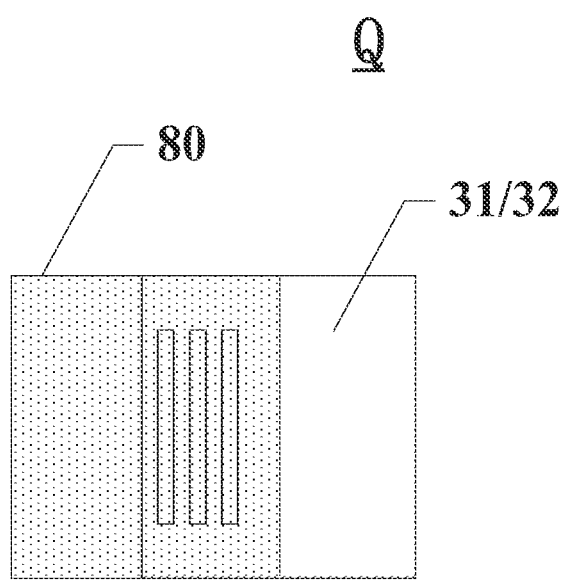
FIG. 17 is a schematic enlarged diagram showing an area Q in FIG. 16.

FIG. 16 is a schematic top view of another display panel according to some embodiments of the present disclosure. When the display panel is a liquid crystal display panel, in connection with FIG. 2 and FIG. 16, in the non-display area NA, the array substrate and the color film substrate are sealed through sealant 80. The liquid crystal may be filled in a sealed space formed by the array substrate 101, the color film substrate 102, and the sealant 80. As shown in FIG. 1, the sealant 80 is in the non-display area NA, and the first heating bus 31 and the second heating bus 32 of embodiments of the present disclosure are also arranged in the non-display area NA. Thus, in the non-display area In NA, the first heating bus 31 and the second heating bus 32 may overlap with the sealant. FIG. 17 shows a schematic enlarged diagram showing an area Q in FIG. 16. FIG. 17 shows a schematic diagram of a relative position relationship of the sealant and the heating bus in the display panel according to some embodiments of the present disclosure. FIG. 17 is a schematic diagram showing the overlap of the sealant and the heating bus in a partial position of the non-display area NA. In some embodiments, when the first heating bus 31 or the second heating bus 32 is arranged on the array substrate, the first heating bus 31 or the second heating bus 32 may be arranged between the substrate of the array substrate and the sealant 80. In the structure of FIG. 17, the first heating bus 31 or the second heating bus 32 is on the top, and the sealant 80 is on the bottom, which is viewed from a side of the substrate of the array substrate.

In connection with FIG. 1 to FIG. 11, FIG. 16, and FIG. 17, in embodiments of the present disclosure, the non-display NA includes sealant 80. Along the third direction, the first heating bus 31 or the second heating bus 32 overlaps with the sealant 80 and forms an overlapping area. In the overlapping area, the first heating bus 31 or the second heating bus 32 may be in a hollow or comb shape. The display panel 100 includes the substrate 00. The third direction is perpendicular to the plane where the substrate 00 is located.

In some embodiments, the display panel 100 of embodiments of the present disclosure may include a liquid crystal display panel. In order to prevent liquid crystal leakage and entry of an external contaminant, the sealant 80 may be coated on a peripheral area of the display panel 100. Currently, the sealant 80 used in the display field is usually cured in an ultraviolet light and heat curing manner. When the first heating bus 31 or the second heating bus 32 is arranged in the frame area of the display panel, since the heating bus is made of metal, the heating bus may block the ultraviolet light to a certain degree. Thus, in embodiments of the present disclosure, the overlapping area between the first heating bus 31 or the second bus 32 and the sealant 80 may be in a hollow shape or a comb shape to ensure that the first heating bus 31 or the second heating bus 32 has a certain light transmittance. Therefore, the sealant 80 that overlaps with the first heating bus 31 or the second heating bus 32 may be cured reliably, which is beneficial to improve the seal reliability after arranging the first heating bus 31 and the second heating bus 32 into the display panel.

Figure 18:
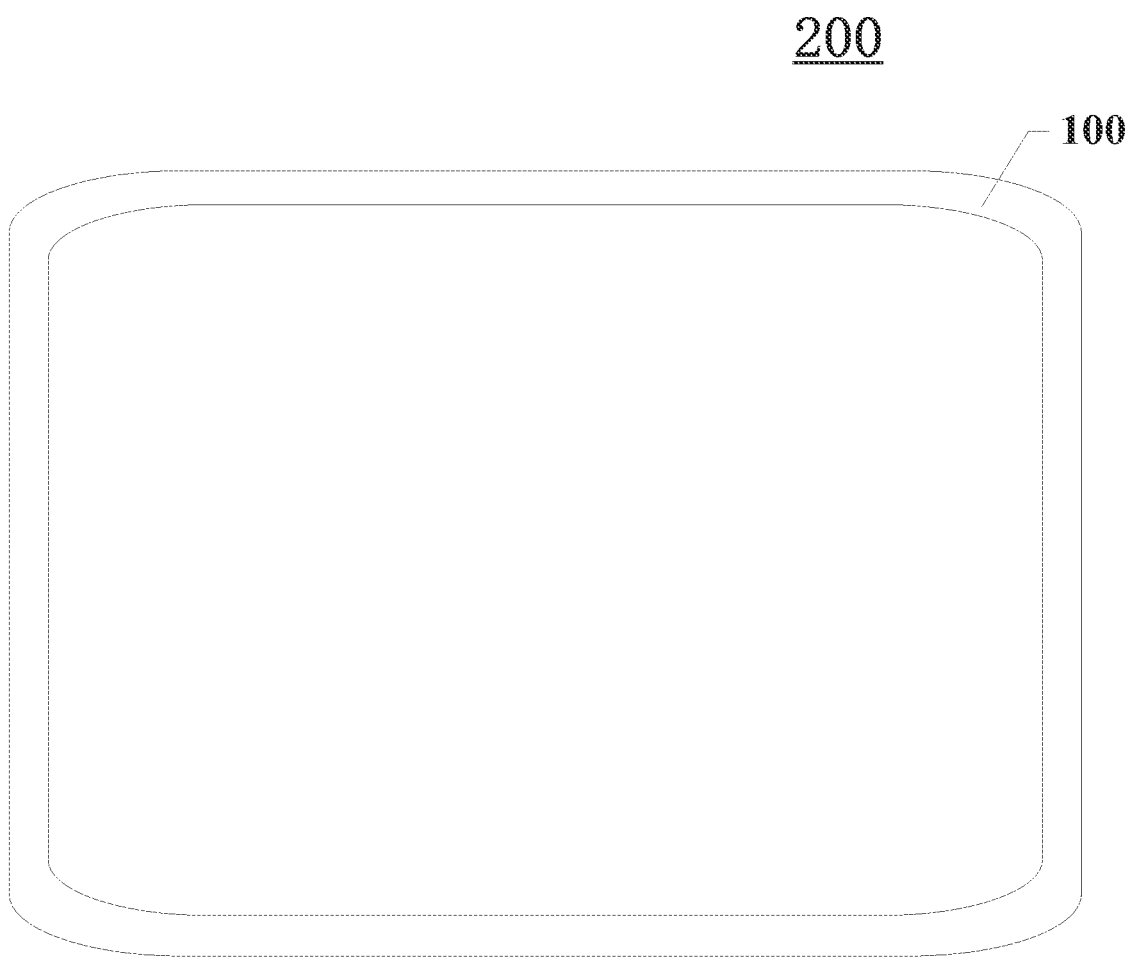
FIG. 18 is a schematic structural diagram of a display device according to some embodiments of the present disclosure.

Based on the same concept, the present disclosure also provides a display device. FIG. 18 is a schematic structural diagram of the display device according to some embodiments of the present disclosure. As shown in FIG. 18, the display device includes the display panel 100 of any embodiments of the present disclosure. In connection with FIG. 1 to FIG. 11, on the side of the display device, the first signal ends of all the heating wires are electrically connected to the first line segment. The second signal ends of all the heating wires are electrically connected to the second line segment. Compared to a manner that the first signal ends or the second signal ends are connected to different wires, the number of the signal lines in the display device may be reduced, the wiring structure of the display device may be significantly reduced. Thus, the manufacturing process may be simplified, and the cost may be saved. In addition, in the wiring manner, the frame space of the display device may be appropriately used, which is beneficial to realizing the narrow frame design.

For embodiments of the display device of the present disclosure, reference may be made to embodiments of the drive circuit, which are not repeated here. The display device of embodiments of the present disclosure may include any product or component having a display function, such as a cell phone, a tablet computer, a television, a monitor, a laptop, a digital photo frame, and a navigator. The display device may be suitable for a display apparatus that may be used in a low-temperature environment.

In summary, the display panel and the display device of the present disclosure may at least achieve the following beneficial effects.

In the display panel and the display device of the present disclosure, the heating wire is arranged in the display panel. In the low-temperature display phase, the heating wire may be configured to heat the display panel, which satisfies the normal use requirement of the display product in a low-temperature environment. The structure of the product may be significantly simplified compared to the solution of additionally introducing the heater in the existing technology. In the present disclosure, the first signal ends and the second signal ends of the heating wires may be arranged on the first side of the display area along the first direction. The first line segment of the first heating bus and the second line segment of the second heating wire may be also arranged on the first side. On the first side, the first signal ends of all the heating wires may be electrically connected to the first line segment, and the second signal ends of all the heating wires may be electrically connected to the second line segment. Compared to the manner that the first signal ends or the second signal ends are connected to different wires, the wiring structure of the display device may be significantly simplified, which is beneficial to simplifying the manufacturing process and reducing the cost. In addition, the first signal ends and the second signal ends of the heating wires and the first line segment and the second line segment of the heating buses are arranged on the first side of the display area. Thus, the frame space of the display panel may be appropriately used, which is beneficial to realizing the narrow frame design.

Although some embodiments of the present disclosure have been described in detail through examples, those skilled in the art should understand that the above examples are only provided for illustration and are not provided to limit the scope of the present disclosure. Those skilled in the art should understand that without departing from the scope and spirit of the present disclosure, modifications may be made to embodiments of the present disclosure. The scope of the present application should be defined by the appended claims.

What is claimed is:

1. A display panel comprising:
   a display area;
   a non-display area at least partially surrounding the display area; and
   a plurality of heating wires arranged in the display area, the plurality of heating wires extending along a first direction and being arranged along a different second direction, and the first direction intersecting with the second direction, wherein:
      each heating wire of the plurality of heating wires includes a first signal end and a second signal end; and
      the first signal end and the second signal end of a same heating wire are arranged on a first side of the display area along the first direction; and
   a first voltage terminal and a second voltage terminal arranged in the non-display area, the first voltage terminal being electrically connected to the first signal end through a first heating bus, and the second voltage terminal being electrically connected to the second signal end through a second heating bus, wherein:
      the first heating bus and the second heating bus are exclusively disposed in the non-display area;
      the first heating bus includes at least one first line segment arranged on the first side, and two or more heating wires are connected to a same first line segment;
      the second heating bus includes at least one second line segment arranged on the first side, and two or more heating wires are connected to a same second line segment; and
      the first line segment and the second line segment extend along the second direction.

2. The display panel according to claim 1, wherein:
   the first voltage terminal and the second voltage terminal are arranged on a second side of the display area along the first direction; and
   the second side is opposite to the first side.

3. The display panel according to claim 2, further comprising:
   a gate line and a data line arranged in the display area; and
   a bonding area on the second side, the first voltage terminal and the second voltage terminal being arranged in the bonding area, wherein:
      the bonding area includes a plurality of first conductive pads electrically connected to the gate line and/or the data line; and
      the first voltage terminal, the second voltage terminal, and the plurality of first conductive pads are electrically connected to a same flexible circuit board.

4. The display panel according to claim 3, wherein the bonding area further includes:
   a control chip, the plurality of first conductive pads being electrically connected to the gate line and/or the data line through the control chip.

5. The display panel according to claim 3, wherein:
   a control chip is arranged on the flexible circuit board and is electrically connected to the plurality of first conductive pads.

6. The display panel according to claim 3, wherein:
   the first voltage terminal and the second voltage terminal are arranged on two sides of the plurality of first conductive pads along the second direction; and
   the first heating bus and the second heating bus on the second side extend from different sides of the display panel to the first side.

7. The display panel according to claim 2, further comprising:
   a substrate;
   a plurality of gate lines; and
   a gate drive unit connected to the plurality of gate lines; wherein:
      a part of the first heating bus or the second heating bus and the gate drive unit are arranged on a same side of the display panel;
      the first heating bus or the second heating bus are arranged on a side of the gate drive unit away from the display area;
      the first heating bus and the gate drive unit do not overlap along a third direction; and
      the third direction is perpendicular to a plane where the substrate is located.

8. The display panel according to claim 7, wherein:
   the gate drive unit is configured in parallel with a third side of the display area along the second direction; and
   the third side is neighboring to the first side and the second side.

9. The display panel according to claim 2, wherein the non-display area further includes:
   a fan-out area on the second side, the first voltage terminal and the second voltage terminal being on a side of the fan-out area away from the display area, and the first heating bus and the second heating bus on the second side being on the side of the fan-out area away from the display area.

10. The display panel according to claim 1, wherein:
    the first voltage terminal, the second voltage terminal, the first heating bus, and the second heating bus are arranged on the first side.

11. The display panel according to claim 10, further comprising:
a gate line and a data line arranged in the display area; and
a bonding area on a side of the display area along the first direction, the first voltage terminal and the second voltage terminal being arranged in the bonding area, and the bonding area including:
at least two first conductive pad groups arranged along the second direction, the first conductive pad groups including a plurality of first conductive pads, and the plurality of first conductive pads being electrically connected to the gate line and/or the data line;
at least two first voltage terminals and at least two second voltage terminals, the at least two first voltage terminals being electrically connected to the first heating bus, and the at least two second voltage terminals being electrically connected to the second heating bus.

12. The display panel according to claim 11, wherein:
the first voltage terminal and the second voltage terminal are arranged on two sides of one of the first conductive pad groups along the second direction, respectively.

13. The display panel according to claim 11, wherein:
the first voltage terminals are connected to the same first heating bus; and
the second voltage terminals are connected to the same second heating bus.

14. The display panel according to claim 1, further comprising:
a plurality of first heating pads arranged at the first voltage terminal, the first heating bus being electrically connected to the plurality of first heating pads; and
a plurality of second heating pads arranged at the second voltage terminal, the second heating bus being electrically connected to the plurality of second heating pads.

15. The display panel according to claim 1, wherein:
the first heating bus and the second heating bus have a same material;
a ratio of a difference between a length of the first heating bus and a length of the second heating bus to the length of a longer one of the first heating bus and the second heating bus is a, and a is smaller than or equal to 10%.

16. The display panel according to claim 1, wherein:
the first voltage terminal is a positive voltage terminal;
the second voltage terminal is a negative voltage terminal; and
the second voltage terminal is connected to a ground end of the display panel.

17. The display panel according to claim 1, further comprising:
a substrate; and
a gate metal layer and a source-drain metal layer formed on the substrate, the gate metal layer being formed between the substrate and the source-drain metal layer;
wherein:
the first heating bus and the second heating bus are arranged on the gate metal layer; or
the first heating bus and the second heating bus are arranged on the source-drain metal layer; or
one of the first heating bus and the second heating bus is arranged on the gate metal layer, and the other one of the first heating bus and the second heating bus is arranged on the source-drain metal layer.

18. The display panel according to claim 1, further comprising:
a substrate; and
a gate metal layer, a source-drain metal layer, and an auxiliary metal layer formed on the substrate, the gate metal layer being formed between the substrate and the source-drain metal layer, and the auxiliary metal layer being formed on a side of the gate metal layer facing the substrate or on a side of the source-drain metal layer away from the substrate;
wherein:
the first heating bus and the second heating bus are arranged on the auxiliary metal layer; or
one of the first heating bus and the second heating bus is arranged on the auxiliary metal layer, and the other one of the first heating bus and the second heating bus is arranged on the gate metal layer or the source-drain metal layer.

19. The display panel according to claim 1, further comprising:
a substrate;
a gate metal layer, a source-drain metal layer, and an auxiliary metal layer formed on the substrate, the gate metal layer being formed between the substrate and the source-drain metal layer, and the auxiliary metal layer being formed on a side of the gate metal layer facing the substrate or on a side of the source-drain metal layer away from the substrate;
wherein:
the first heating bus is arranged on at least two layers of the gate metal layer, the source-drain layer, and the auxiliary metal layer, and parts of the first heating bus arranged on different metal layers are electrically connected to each other; and/or
the second heating bus is arranged on at least two layers of the gate metal layer, the source-drain layer, and the auxiliary metal layer, and parts of the second heating bus arranged on different metal layers are electrically connected to each other.

20. A display panel, comprising:
a substrate;
a display area;
a non-display area at least partially surrounding the display area; and
a plurality of heating wires arranged in the display area, the plurality of heating wires extending along a first direction and being arranged along a second direction, and the first direction intersecting with the second direction, wherein:
each heating wire of the plurality of heating wires includes a first signal end and a second signal end; and
the first signal end and the second signal end of a same heating wire are arranged on a first side of the display area along the first direction; and
a first voltage terminal and a second voltage terminal arranged in the non-display area, the first voltage terminal being electrically connected to the first signal end through a first heating bus, and the second voltage terminal being electrically connected to the second signal end through a second heating bus, wherein:
the first heating bus includes at least a first line segment arranged on the first side;
the second heating bus includes at least a second line segment arranged on the first side;
the first line segment and the second line segment extend along the second direction;

the non-display area includes a sealant;
the first heating bus or the second heating bus overlaps with the sealant to form a overlapping area along a third direction;
in the overlapping area, the first heating bus or the second heating bus is in a hollow or comb shape; and
the third direction is perpendicular to a plane where the substrate is located.

21. A display device comprising a display panel, including:
a display area;
a non-display area at least partially surrounding the display area;
a plurality of heating wires arranged in the display area, the plurality of heating wires extending along a first direction and being arranged along a different second direction, the first direction intersecting with the second direction, wherein:
each heating wire of the plurality of heating wires includes a first signal end and a second signal end; and
the first signal end and the second signal end of the same heating wire are arranged on a first side of the display area along the first direction; and
a first voltage terminal and a second voltage terminal arranged in the non-display area, the first voltage terminal being electrically connected to the first signal end through a first heating bus, and the second voltage terminal being electrically connected to the second signal end through a second heating bus, wherein:
the first heating bus and the second heating bus are exclusively disposed in the non-display area;
the first heating bus includes at least one first line segment arranged on the first side, and two or more heating wires are connected to a same first line segment;
the second heating bus includes at least one second line segment arranged on the first side, and two or more heating wires are connected to a same second line segment; and
the first line segment and the second line segment extend along the second direction.

* * * * *